(12) United States Patent
Lee et al.

(10) Patent No.: US 12,432,149 B2
(45) Date of Patent: Sep. 30, 2025

(54) METHOD AND DEVICE FOR INCREASING NETWORK DATA SPEED IN ELECTRONIC DEVICE

(71) Applicant: Samsung Electronics Co., Ltd., Suwon-si (KR)

(72) Inventors: Wonbo Lee, Suwon-si (KR); Youngwook Kim, Suwon-si (KR); Youngki Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 734 days.

(21) Appl. No.: 17/711,706

(22) Filed: Apr. 1, 2022

(65) Prior Publication Data

US 2022/0231954 A1    Jul. 21, 2022

Related U.S. Application Data

(63) Continuation of application No. PCT/KR2020/012374, filed on Sep. 14, 2020.

(30) Foreign Application Priority Data

Oct. 4, 2019    (KR) .................. 10-2019-0123344

(51) Int. Cl.
   *H04L 47/20*    (2022.01)
   *G06F 9/50*    (2006.01)
   (Continued)

(52) U.S. Cl.
   CPC .......... *H04L 47/20* (2013.01); *G06F 9/5027* (2013.01); *H04L 47/24* (2013.01); *G06F 2209/501* (2013.01); *H04L 43/0894* (2013.01)

(58) Field of Classification Search
   CPC ..... H04L 47/20; H04L 47/24; H04L 43/0894; H04L 47/2483; H04L 45/54; H04L 69/10; G06F 9/5027; G06F 2209/501; G06F 9/46
   (Continued)

(56) References Cited

U.S. PATENT DOCUMENTS 6,684,341 B1    1/2004    Malcolm et al.
7,861,068 B2    12/2010    Gorbatov et al.
(Continued)

FOREIGN PATENT DOCUMENTS

JP    2001-273057 A    10/2001
JP    3793123 B2    7/2006
(Continued)

*Primary Examiner* — Wing F Chan
*Assistant Examiner* — John Fan
(74) *Attorney, Agent, or Firm* — Jefferson IP Law, LLP

(57) ABSTRACT

A device and method for improving data transmission and reception throughput in an electronic device are provided. The electronic device includes a communication circuit for communication with a designated network, a processor including a multi-core, and a memory. The memory may store instructions that, when executed, cause the processor to detect a new data flow on the basis of the communication circuit, identify the type of the network connected via the communication circuit, identify, on the basis of a policy related to the identified network, a boosting start condition for the new data flow, and when boosting for the new data flow starts, set the frequency of a core, which processes a packet related to the new data flow, to a designated frequency.

15 Claims, 15 Drawing Sheets

(51) Int. Cl.
*H04L 43/0894* (2022.01)
*H04L 47/24* (2022.01)

(58) Field of Classification Search
USPC .......................................................... 709/235
See application file for complete search history.

(56) References Cited

U.S. PATENT DOCUMENTS

| | | |
|---|---|---|
| 8,250,395 B2 | 8/2012 | Carter et al. |
| 8,510,740 B2 | 8/2013 | Salsbery et al. |
| 8,582,480 B2 | 11/2013 | Jin et al. |
| 8,621,253 B1 | 12/2013 | Brown et al. |
| 8,909,751 B2 | 12/2014 | Fortier et al. |
| 2002/0099529 A1* | 7/2002 | Tang ..................... H04L 1/0003 703/22 |
| 2005/0182982 A1 | 8/2005 | Kojima |
| 2013/0013598 A1* | 1/2013 | Kohn .................... H04L 43/026 707/736 |
| 2013/0294239 A1* | 11/2013 | Szabo ..................... H04L 45/64 370/235 |
| 2014/0373025 A1 | 12/2014 | Kim |
| 2015/0195183 A1* | 7/2015 | Park ..................... H04L 41/0895 709/242 |
| 2016/0050111 A1 | 2/2016 | Jang et al. |
| 2019/0272002 A1 | 9/2019 | Seenappa et al. |
| 2019/0324888 A1* | 10/2019 | Evans ................. G06F 11/0772 |
| 2020/0310994 A1* | 10/2020 | ChoFleming ....... G06F 15/8007 |

FOREIGN PATENT DOCUMENTS

| | | |
|---|---|---|
| JP | 5942702 B2 | 6/2016 |
| KR | 10-2013-0046899 A | 5/2013 |
| KR | 10-2014-0145748 A | 12/2014 |
| KR | 10-2016-0019824 A | 2/2016 |

* cited by examiner

METHOD AND DEVICE FOR INCREASING NETWORK DATA SPEED IN ELECTRONIC DEVICE

CROSS-REFERENCE TO RELATED APPLICATION(S)

This application is a continuation application, claiming priority under § 365(c), of an International application No. PCT/KR2020/012374, filed on Sep. 14, 2020, which is based on and claims the benefit of a Korean patent application number 10-2019-0123344, filed on Oct. 4, 2019, in the Korean Intellectual Property Office, the disclosure of which is incorporated by reference herein in its entirety.

BACKGROUND

1. Field

The disclosure relates to a device and a method for improving data transmission/reception throughput in an electronic device.

2. Description of Related Art

There have recently been increasing interests in 5th generation (5G) network (or mobile) communication 5th generation new radio (5G NR). 5G network communication may refer to a mobile communication technology which uses broader high-frequency bands than existing legacy network communication (for example, 4th generation (4G) long term evolution (LTE) communication), and which provides ultra-low latency and super-connectivity. 5G network communication can broadly use frequencies and thus are capable of large-capacity data transmission and latency-less communication. For example, 5G mobile communication may refer to a communication technology which uses super-high-frequency bands (for example, 26 GHz, 28 GHz, or 39 GHz) referred to as sub-6 GHz frequency bands (for example, 2.5 GHz, 3.5 GHz, or 4.5 GHz) and mmWave, and which may be callable of large-capacity data transmission and latency-less communication.

There have recently been ongoing research and development regarding various technologies for supporting 5G network communication. For example, communication services that are recently being commercialized include 5G (or 5G NR) services, and electronic devices have been developed to support 5G services. For example, electronic devices tend to have a higher level of hardware and/or software to support ultra-low latency and super-connectivity based on 5G network communication.

An electronic device may adjust stepwise and use the clock speed (or frequency) of a processor according to the rate of use of the processor (for example, mobile application processor (AP)). For example, due to mobile characteristics (for example, mobility), the battery use time of an electronic device may be important. To this end, when the rate of use of the processor is low, or during a standby mode, the electronic device may operate with low power or use a low frequency (for example, central processing unit (CPU) frequency), thereby reducing current consumption, and when the rate of use of the processor is high, or when the data throughput is high, the electronic device may operate with high power (or high performance) or use a high frequency, thereby having a performance gain.

In 5G networks, meanwhile, very large channel bandwidths allow data transmission of Gbps levels or higher, and it is possible to use an edge computing server near the user, such as multi-access edge computing (MEC), thereby reducing the latency to several milliseconds or less. In such an environment, there may be a generalized pattern in which data transmission is completed in a short period of time at a very high transmission rate even with the same size of data, and it may thus be important to maximize the transmission rate as much as possible during the initial phase of transmission.

In an environment that facilitates high-speed low-latency communication, such as a 5G network, the packet processing rate of the electronic device may be affected. For example, if the initial amount of processed data (or processing rate) is low, the electronic device may maintain a low performance (for example, frequency, processing rate) of the processor to reduce current consumption, and may await an increase in the amount of data transmitted from the network. On the other hand, if the initial data processing rate of the electronic device is low, the network may consider the same as network congestion and may await an increase in the processing rate of the electronic device. Therefore, in such a situation, a latency problem may occur until the maximum bandwidth is reached and used, while the actually available maximum bandwidth between the electronic device and the network is high.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a device and a method for improving data transmission/reception throughput in an electronic device.

Another aspect of the disclosure is to provide an apparatus and a method wherein, when an electronic device receives data, the frequency (or processing rate) of a processor may be controlled with a designated value.

Another aspect of the disclosure is to provide an apparatus and a method wherein, when an electronic device begins to receive data, the frequency of at least one core that processes packets related to received data in a processor may be boosted to a designated frequency, before the performance (for example, rate of use or throughput) of the processor increases, and packets may be processed at the designated frequency.

Another aspect of the disclosure is to provide an apparatus and a method wherein, instead of the processor throughput, the characteristics of a used network, the state of an electronic device, a used application, or a traffic pattern is analyzed in the initial phase of session connection with a network, such that the processor frequency can be boosted before the throughput increases.

Additional aspects will be set forth in part in the description which follows and, in part, will be apparent from the description, or may be learned by practice of the presented embodiments.

In accordance with an aspect of the disclosure, an electronic device is provided. The electronic device includes a communication circuit for communication with a designated network, a processor configured to include multiple cores, and a memory configured to be operatively connected to the processor, wherein the memory stores instructions that, when executed, cause the processor to detect a new data flow based on the communication circuit, identify a type of a network connected through the communication circuit, identify a boosting start condition for the new data flow based on a policy related to the identified network, and configure a frequency of a core that processes a packet related to the new data flow to a designated frequency when boosting for the new data flow is started.

In accordance with another aspect of the disclosure, an operation method of an electronic device is provided. The operation method includes detecting a new data flow based on a communication circuit, identifying a type of a network connected through the communication circuit, identifying a boosting start condition for the new data flow based on a policy related to the identified network, and configuring a frequency of a core that processes a packet related to the new data flow to be a designated frequency when boosting for the new data flow is started.

In order to solve the above-mentioned problems, various embodiments of the disclosure may include a computer-readable recording medium in which a program for executing the method in a processor is recorded.

According to an electronic device and a method for operating the same according to various embodiments, when an electronic device begins to receive data, the frequency of at least one core that processes packets related to received data in a processor may be preemptively boosted to a designated frequency before the performance (for example, rate of use or throughput) of the processor (for example, CPU) increases.

According to various embodiment, initial throughput may be improved, based on initial boosting related to a processor (for example, a core that processes received data packets in the processor), and a benefit of data transmission time may be obtained.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
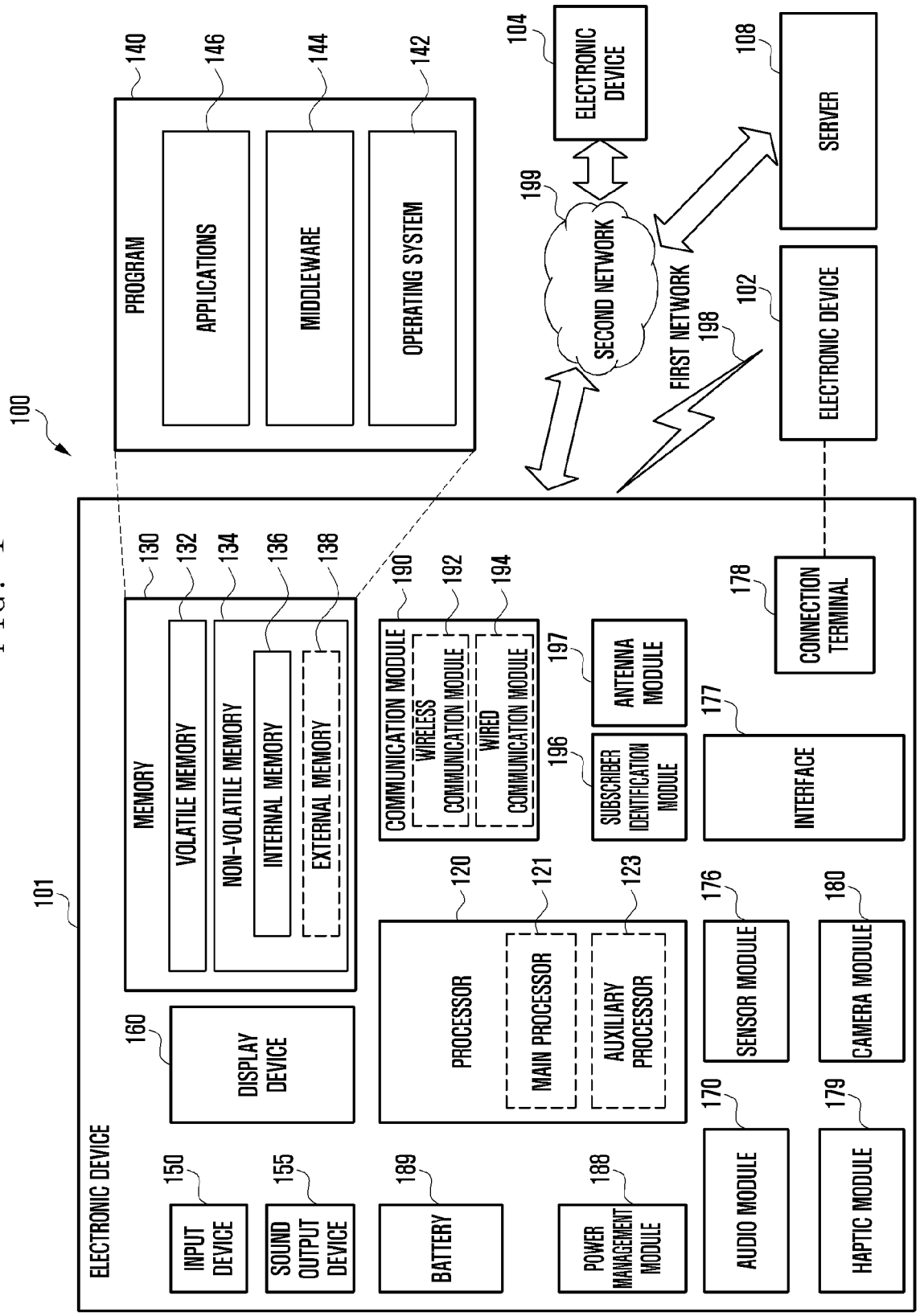
FIG. 1 illustrates an electronic device in a network environment according to an embodiment of the disclosure.

FIG. 1 illustrates an electronic device in a network environment according to an embodiment of the disclosure.

Referring to FIG. 1, an electronic device 101 in a network environment 100 may communicate with an external electronic device 102 via a first network 198 (e.g., a short-range wireless communication network), with an external electronic device 104 or a server 108 via a second network 199 (e.g., a long-range wireless communication network), or with the external electronic device 104 via the server 108, and may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) card 196, and an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. The processor 120 may load a command or data received from another component (e.g., the sensor module 176 or the communication module 190) in a volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101 and may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input device 150 may receive a command or data to be used by another component (e.g., the processor 120) of the electronic device 101, from the outside (e.g., a user) of the electronic device 101, and may include a microphone, a mouse, a keyboard, or a digital pen (e.g., a stylus pen).

The sound output device 155 may output sound signals to the outside of the electronic device 101 and may include a speaker or a receiver. The speaker may be used for general purposes, such as playing multimedia or playing record, and the receiver may be used for incoming calls and may be implemented as separate from, or as part of the speaker.

The display device 160 may visually provide information to the outside (e.g., a user) of the electronic device 101 and may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa, and may obtain the sound via the input device 150, or output the sound via the sound output device 155 or a headphone of an external electronic device (e.g., the external electronic device 102) directly (e.g., over wires) or wirelessly coupled with the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state, and may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., over wires) or wirelessly, and may include a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the external electronic device 102), and may include a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation, and may include a motor, a piezoelectric element, or an electric stimulator.

The camera module 180 may capture a still image or moving images and may include one or more lenses, image sensors, image signal processors, or flashes.

The power management module 188 may manage power supplied to the electronic device 101, and may be implemented as at least part of a power management integrated circuit (PMIC).

The battery 189 may supply power to at least one component of the electronic device 101, and may include a primary cell which is not rechargeable, a secondary cell which is rechargeable, or a fuel cell.

The communication module 190 (e.g., a transceiver) may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199

(e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101 and may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. Another component (e.g., a radio-frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 and 104 may be a device of a same type as, or a different type, from the electronic device 101.

All or some of operations to be executed at the electronic device 101 may be executed at one or more of the external electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing, as at least part of a reply to the request. To that end, a cloud, distributed, or client-server computing technology may be used, for example.

Before describing certain embodiments, the electronic device 101 to which an embodiment of the disclosure is applicable will be described.

Figure 2:
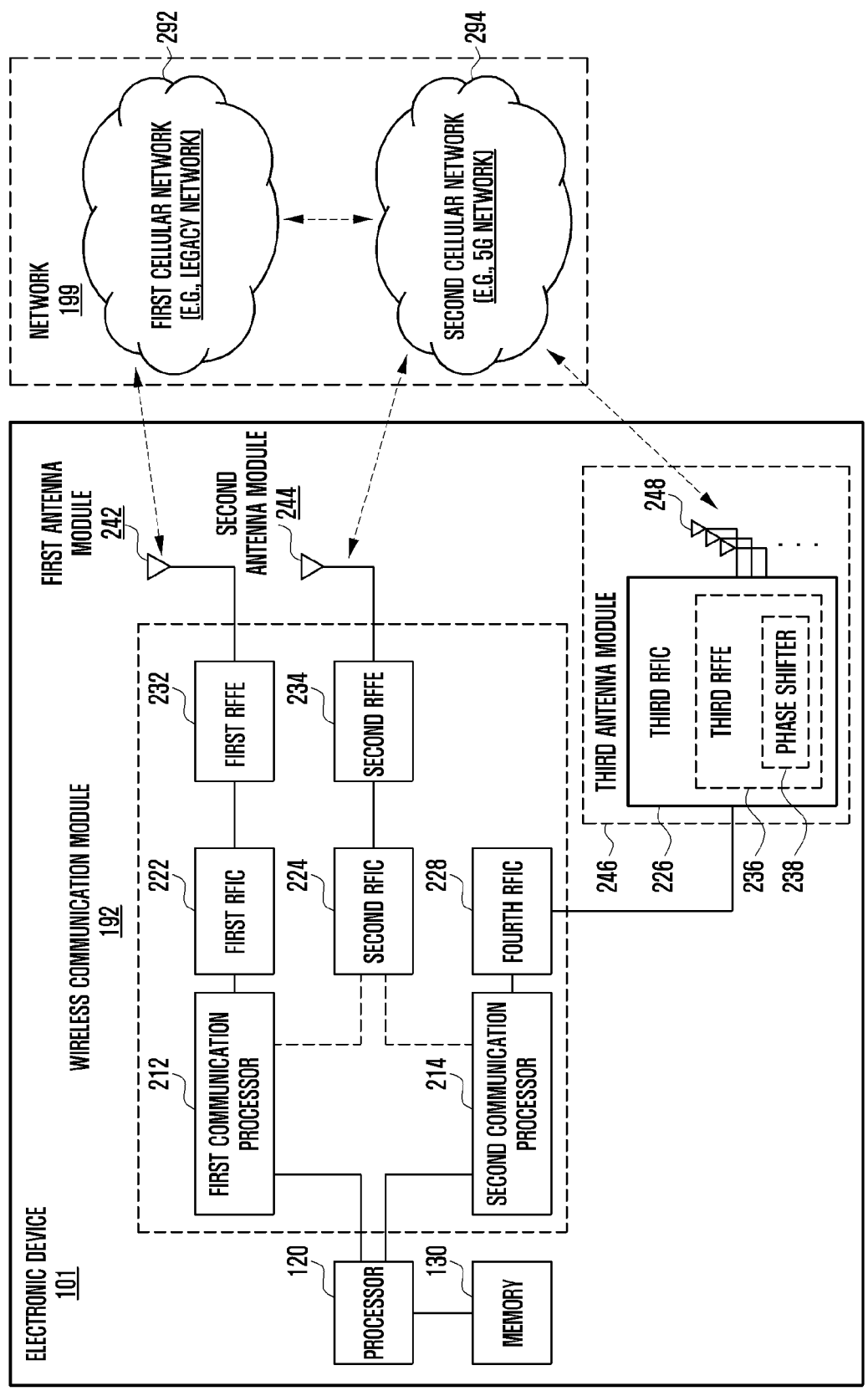
FIG. 2 illustrates an electronic device for supporting legacy network communication and 5G network communication according to an embodiment of the disclosure.

FIG. 2 illustrates an electronic device for supporting legacy network communication and 5G network communication according to an embodiment of the disclosure.

Referring to FIG. 2, an electronic device 101 may further include a first communication processor 212, a second communication processor 214, a first RFIC 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130.

The second network 199 may include a first network 292 and a second network 294. The electronic device 101 may further include at least one of the components shown in FIG. 1, and the second network 199 may further include at least another network. The first communication processor 212, the second communication processor 214, the first RFIC 222, the second RFIC 224, the fourth RFIC 228, the first RFFE 232, and the second RFFE 234 may constitute at least a part of the wireless communication module 192. The fourth RFIC 228 may be omitted, or may be included as a part of the third RFIC 226.

The first communication processor 212 may establish a communication channel in a band to be used for wireless communication with the first network 292, and may support legacy network communication through the established communication channel. The first network may be a legacy network including a second generation (2G), third generation (3G), fourth generation (4G), or long-term evolution (LTE) network.

The second communication processor 214 may establish a communication channel corresponding to a designated band (e.g. from about 6 GHz to about 60 GHz) among bands to be used for wireless communication with the second network 294, and may support 5G network communication through the established communication channel. The second network 294 may be a 5G network defined in the third generation partnership project (3GPP).

Additionally, the first communication processor 212 or the second communication processor 214 may establish a communication channel corresponding to another designated band (e.g. about 6 GHz or less) among bands to be used for wireless communication with the second network 294, and may support 5G network communication through the established communication channel. The first communication processor 212 and the second communication processor 214 may be implemented in a single chip or a single package together with the processor 120, the auxiliary processor 123, or the communication module 190.

At the time of signal transmission, the first RFIC 222 may convert a baseband signal generated by the first communication processor 212 into a radio-frequency (RF) signal of about 700 megahertz (MHz) to about 3 GHz used for the first network 292 (e.g. a legacy network). At the time of signal reception, the RF signal may be acquired from the first network 292 (e.g. a legacy network) through an antenna (e.g. the first antenna module 242), and may be preprocessed through RFFE (e.g. the first RFFE 232). The first RFIC 222 may convert the preprocessed RF signal into a baseband signal which can be processed by the first communication processor 212.

At the time of signal transmission, the second RFIC 224 may convert a baseband signal generated by the first communication processor 212 or the second communication processor 214 into an RF signal (hereinafter, a 5G Sub6 RF signal) of a Sub6 band (e.g. about 6 GHz or less) used for the second network 294 (e.g. a 5G network). At the time of signal reception, the 5G Sub6 RF signal may be acquired from the second network 294 (e.g. a 5G network) through an antenna (e.g. the second antenna module 244), and may be preprocessed through RFFE (e.g. the second RFFE 234). The second RFIC 224 may convert the preprocessed 5G Sub6 RF signal into a baseband signal which can be processed by a corresponding communication processor among the first communication processor 212 and the second communication processor 214.

The third RFIC 226 may convert a baseband signal generated by the second communication processor 214 into an RF signal (hereinafter, a 5G Above6 RF signal) of a 5G Above6 band (e.g. from about 6 GHz to about 60 GHz) to be used in the second network 294 (e.g. a 5G network). At the time of signal reception, the 5G Above6 RF signal may be acquired from the second network 294 (e.g. a 5G network) through an antenna (e.g. the antenna 248), and may be preprocessed through a third RFFE 236. The third RFIC 226 may convert the preprocessed 5G Above6 RF signal into a baseband signal that can be processed by the second communication processor 214. The third RFFE 236 may be configured as a part of the third RFIC 226.

The electronic device 101 may include the fourth RFIC 228 separately from the third RFIC 226 or as at least a part thereof. In this instance, the fourth RFIC 228 may convert a baseband signal generated by the second communication processor 214 into an RF signal (hereinafter, an intermediate-frequency (IF) signal) of an intermediate frequency band (e.g. from about 9 GHz to about 11 GHz) and may then transmit the IF signal to the third RFIC 226. The third RFIC 226 may convert the IF signal into a 5G Above6 RF signal. At the time of signal reception, the 5G Above6 RF signal may be received from the second network 294 (e.g. a 5G network) through an antenna (e.g. the antenna 248) and may be converted into an IF signal by the third RFIC 226. The fourth RFIC 228 may convert the IF signal into a baseband signal that can be processed by the second communication processor 214.

The first RFIC 222 and second RFIC 224 may be implemented as at least a part of a single package or a single chip. The first RFFE 232 and the second RFFE 234 may be implemented as at least a part of a single package or a single chip. At least one antenna module of the first antenna module 242 or the second antenna module 244 may be omitted, or may be combined with the other antenna module to process RF signals of multiple bands corresponding thereto.

The third RFIC 226 and antenna 248 may be arranged on the same substrate to constitute a third antenna module 246. For example, the wireless communication module 192 or the processor 120 may be arranged on a first substrate (e.g. a main PCB). In this instance, the third antenna module 246 may be configured by arranging the third RFIC 226 in a partial area (e.g. a lower surface) of a second substrate (e.g. a sub PCB) independent of the first substrate and arranging the antenna 248 in another partial area (e.g. an upper surface) thereof. Arranging the third RFIC 226 and the antenna 248 on the same substrate can reduce the length of a transmission line therebetween, and may reduce the loss (e.g. attenuation) of a signal in a high-frequency band (e.g. about 6 GH- about 60 GHz), used for 5G network communication, by a transmission line. Therefore, the electronic device 101 may exhibit an enhanced quality or speed of communication with the second network 294 (e.g. a 5G network).

The antenna 248 may be configured as an antenna array including multiple antenna elements which can be used for beamforming. In this instance, the third RFIC 226 may include, as a part of the third RFFE 236, multiple phase shifters 238 corresponding to the multiple antenna elements. At the time of signal transmission, the multiple phase shifters 238 may shift the phases of 5G Above6 RF signals to be transmitted from the electronic device 101 to an external device (e.g. a base station of a 5G network) through antenna elements corresponding thereto. At the time of signal reception, the multiple phase shifters 238 may shift the phases of 5G Above6 RF signals received from the outside through antenna elements corresponding thereto into an identical or substantially identical phase, thus allowing the transmission or reception through beamforming between the electronic device 101 and the outside.

The second network 294 (e.g. a 5G network) may be operated independently of the first network 292 (e.g. a legacy network) (e.g. stand-alone (SA)) or may be operated while being connected to the first network (e.g. non-stand-alone (NSA)). For example, the 5G network may include only an access network (e.g. a 5G radio access network (RAN) or next-generation RAN (NG RAN)) and may not include a core network (e.g. a next-generation core (NGC)). In this instance, the electronic device 101 may access an access network of a 5G network and may then access an external network (e.g. Internet) under the control of a core network (e.g. an evolved packed core (EPC) network) of a legacy network. Protocol information (e.g. LTE protocol information) for communication with the legacy network or protocol information (e.g. new radio (NR) protocol information) for communication with the 5G network are stored in a memory 230, and may be accessed by another component (e.g. the processor 120, the first communication processor 212, or the second communication processor 214).

The electronic device 101 according to embodiments may be one of various types of electronic devices, such as a portable communication device (e.g., a smartphone), a computer device, a portable multimedia device, a portable medical device, a camera, a wearable device, or a home appliance. However, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., over wires), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
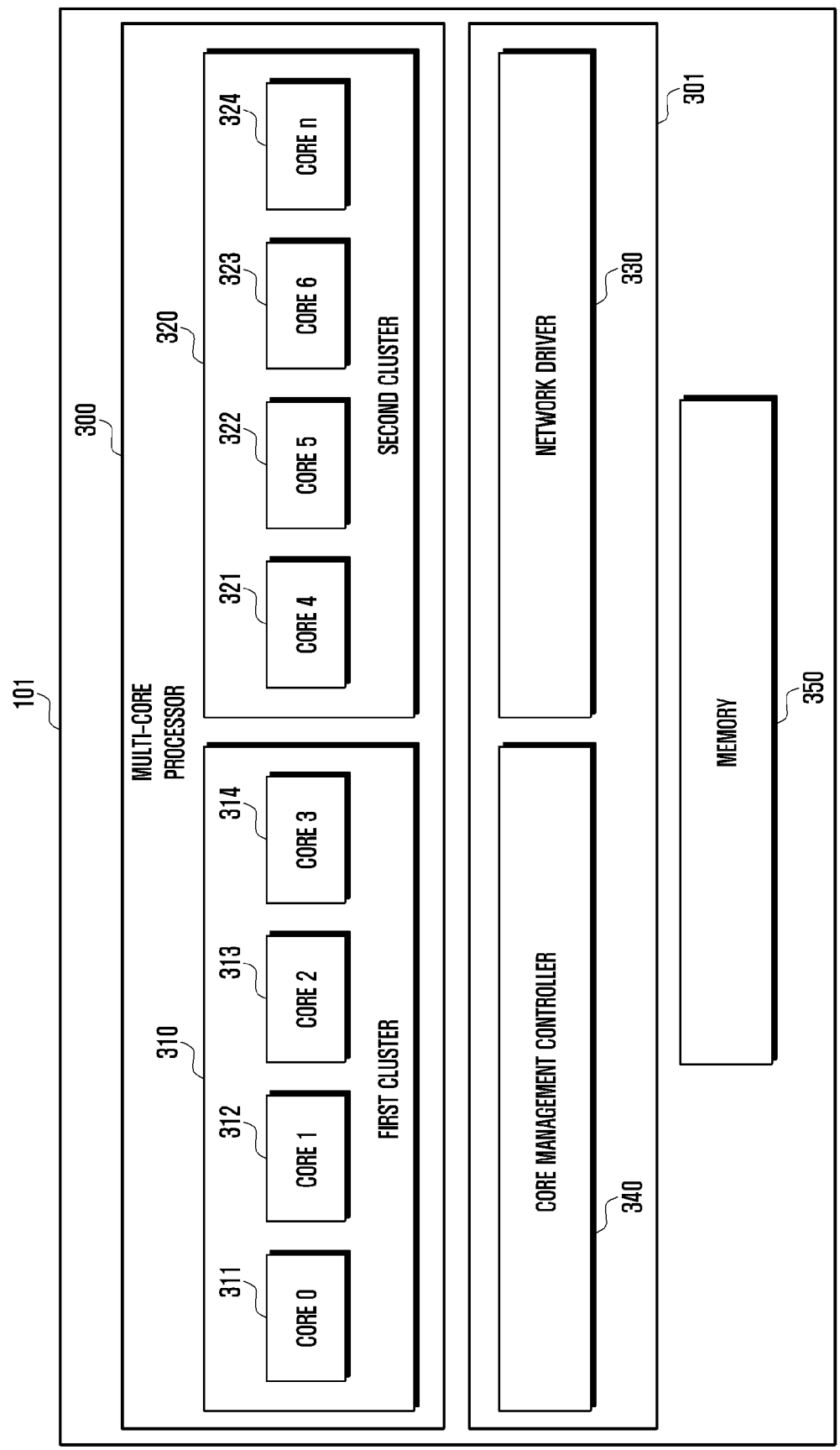
FIG. 3 is a diagram illustrating an example of a processor including multiple cores in an electronic device according to an embodiment of the disclosure.

FIG. 3 is a diagram illustrating an example of a processor including multiple cores in an electronic device according to an embodiment of the disclosure.

Referring to FIG. 3, a processor 120 of an electronic device 101 according to an embodiment may include, for example, an application processor (AP) (e.g., a mobile AP). According to an embodiment, the processor 120 (e.g., the AP) of the electronic device 101 may indicate a chip (e.g., SoC, system on chip) including a main processor (e.g., a CPU or a central processing unit) for a main operation, an auxiliary processor (e.g., graphic processing unit (GPU), image signal processor (ISP), or a communication chip {communication processor (CP)} for a communication function) capable of operating independently or together with the main processor, and even a memory (e.g., RAM). According to an embodiment, the processor 120 of the electronic device 101 may be a multi-core processor 300 that integrates several cores (e.g., multiple cores).

According to an embodiment, the number of cores of the multi-core processor 300 may be variously implemented, such as 2, 4, 8, or N (N is a natural number equal to or greater than 1). According to an embodiment, the multi-core processor 300 may be implemented as a heterogeneous multi-core processor (HMP) (e.g., a big/little {big. LITTLE} type processor) capable of increasing performance and battery efficiency by using a high-performance processor (such as a high-performance or high-power CPU) and a low-performance processor (such as a low-performance or low-power CPU) together in consideration of an account battery life (e.g. to maximize usage time). According to an embodiment, the multi-core processor 300 may be divided into a high-performance processor and a low-performance processor, and may include various designs such as 4+4 core, 8+8 core, or 6+2 core.

According to an embodiment, the electronic device 101 including the multi-core processor 300 (e.g., the processor 120 of FIG. 1 or 2) may include multiple cores (e.g., cores 311, 312, 313, and 314 of a first cluster 310 or cores 321, 322, 323, and 324 of a second cluster 320), a network driver 330, a core management controller 340, and a memory 350 (e.g., the memory 130 of FIG. 1). According to an embodiment, the multi-core processor 300 and the memory 130 may be implemented in hardware, and the network driver 330 and the core management controller 340 may be loaded on the memory 130 and implemented in software 301 (e.g., the program 140 of FIG. 1) including an instruction performed by the processor 120 (e.g., the multi-core processor 300).

According to an embodiment, the multiple cores may include at least n cores 311, 312, 313, 314, 321, 322, 323, and 324. According to an embodiment, the multi-core processor 300 may include the first cluster 310 (or a first type core) (e.g., a low-performance core, a low-power core, or a little core) that consumes less power according to traffic processing performance but has low processing power and the second cluster 320 (or a second type core) (e.g., a high-performance core, a high-power core, or a big core) that consumes a lot of power but has high processing power, but the disclosure is not limited thereto. According to an embodiment, the number of cores of the first cluster 310 and the second cluster 320 may be variously determined according to a standard (or specification {spec}) of the electronic device 101.

According to an embodiment, then cores 311, 312, 313, 314, 321, 322, 323, and 324 included in the first cluster 310 and the second cluster 320 may be referred to as core numbers (e.g., core 0, core 1, core 2, core 3, core 4, ..., and core n). The n cores 311, 312, 313, 314, 321, 322, 323, and 324 may be classified into the first cluster 310 and the second cluster 320 according to the performance. According to an embodiment, the electronic device 101 may classify clusters and assign core numbers thereto. For example, when the electronic device 101 includes 8 (e.g., n=7) multiple cores, core 0 311 to core 3 314 may be included in the first cluster 310, and core 4 321 to core 7 324 may be included in the second cluster 320. According to an embodiment, the electronic device 101 may identify (or determine) whether each core is included in the first cluster 310 or the second cluster 320 based on the core numbers.

According to an embodiment, when data is received through the network interface, the network driver 330 may generate an interrupt in the processor 120 (e.g., the multi-core processor 300) to allow the processor 120 to process the data. For example, the network driver 330 may generate the received data in the form of a packet structure (e.g., a socket buffer) that a network protocol (e.g., transmission control protocol/internet protocol (TCP/IP)) stack can understand. According to an embodiment, the network driver 330 may include a network interface driver (e.g., a network interface card (NIC) driver) (not shown). According to an embodiment, the network driver 330 may be a component that controls the operation of a network interface (or a communication circuit {e.g., the wireless communication module 192 of FIG. 1 or 2}) for performing communication between the electronic device 101 and a network, and may be, for example, software. According to an embodiment, the network driver 330 may be connected to a modem of a communication processor (e.g., the first communication processor 212 and the second communication processor 214 of FIG. 2) through an interface (e.g., a peripheral component interconnect express (PCIe) interface). According to an embodiment, the network driver 330 may include a first network driver (e.g. a 5G network driver) for communication related to a first network (e.g. a 5G network), a second network driver (e.g., an LTE driver) for communication related to a second network (e.g. an LTE network), or a third network driver (e.g., a Wi-Fi network or a wireless local area networking (WLAN) driver) for communication related to a third network (e.g., a Wi-Fi network or WLAN), but is not limited thereto. According to an embodiment, the electronic device 101 may access a corresponding network based on the network driver 330 designated for communication with the network. For example, the electronic device 101 may access the network using a MAC address by using a network interface (or a communication circuit {e.g., the wireless communication module 192 of FIG. 1 or FIG. 2}) or a modem as a medium.

According to an embodiment, the network driver 330 may include a reception buffer (Rx buffer) (not shown) that stores a received packet and a transmission buffer (Tx buffer) (not shown) that stores a packet processed by an application (e.g., the application 146 of FIG. 1) of a user area (or an application area) to transmit the packet.

According to an embodiment, the network driver 330 may perform designated network communication with a network through a network interface (or a communication circuit) and may receive a packet. The network driver 330 according to an embodiment may be mounted in a kernel, and may receive an interrupt signal for packet reception from the network interface. The kernel may be included in an operating system (e.g., the operating system 142 of FIG. 1) of the electronic device 101.

According to an embodiment, the core management controller 340 may transmit a core command to the multi-core processor 300 according to a policy to perform frequency boosting. According to an embodiment, the core management controller 340 may be driven by at least one of the cores 311, 312, 313, 314, 321, 322, 323, and 324 of the first cluster 310 and the second cluster 320, or may be driven as a part of the multi-core processor 300 (e.g., the processor 120 of FIG. 1). According to an embodiment, the core management controller 340 may be a separate hardware component independently operated from the multiple cores.

According to another embodiment, the core management controller 340 may be software (e.g., the program 140 of FIG. 1). For example, operations of the core management controller 340 in the form of software may be stored in the form of instructions in the memory 350 and may be executed by the multi-core processor 300.

According to an embodiment, the core management controller 340 may monitor information (e.g., a new data flow) related to the packet transmitted and received through the network, and may determine a core (or a plurality of cores in a cluster unit) to process the packet and a frequency designated in the corresponding core (or a plurality of cores in a cluster unit). Various embodiments of the component and operation of the core management controller 340 according to various embodiments will be described with reference to FIG. 4 to be described later.

According to an embodiment, the memory 350 may include at least one of a dynamic random access memory (DRAM), a static RAM (SRAM), a synchronized DRAM (SDRAM), a double data rate 2 (DDR2) RAM, a Rambus DRAM (RDRAM), or another type of memory. According to an embodiment, the memory 350 may at least temporarily store input data or output data for, for example, software (e.g., the program 140 of FIG. 1) or software-related commands. According to an embodiment, the program may include at least one of an operating system (e.g., the operating system 142 of FIG. 1 or middleware {e.g., the middleware 144 of FIG. 1}) for controlling one or more resources of the electronic device 101, or an application (e.g., the application 146 of FIG. 1). The operating system may control management (e.g., allocation or retrieval) of one or more system resources (e.g., process, memory, or power) of the electronic device 201. The middleware may provide various functions to an application so that functions or information provided from the one or more resources of the electronic device 201 can be used by the application.

Figure 4:
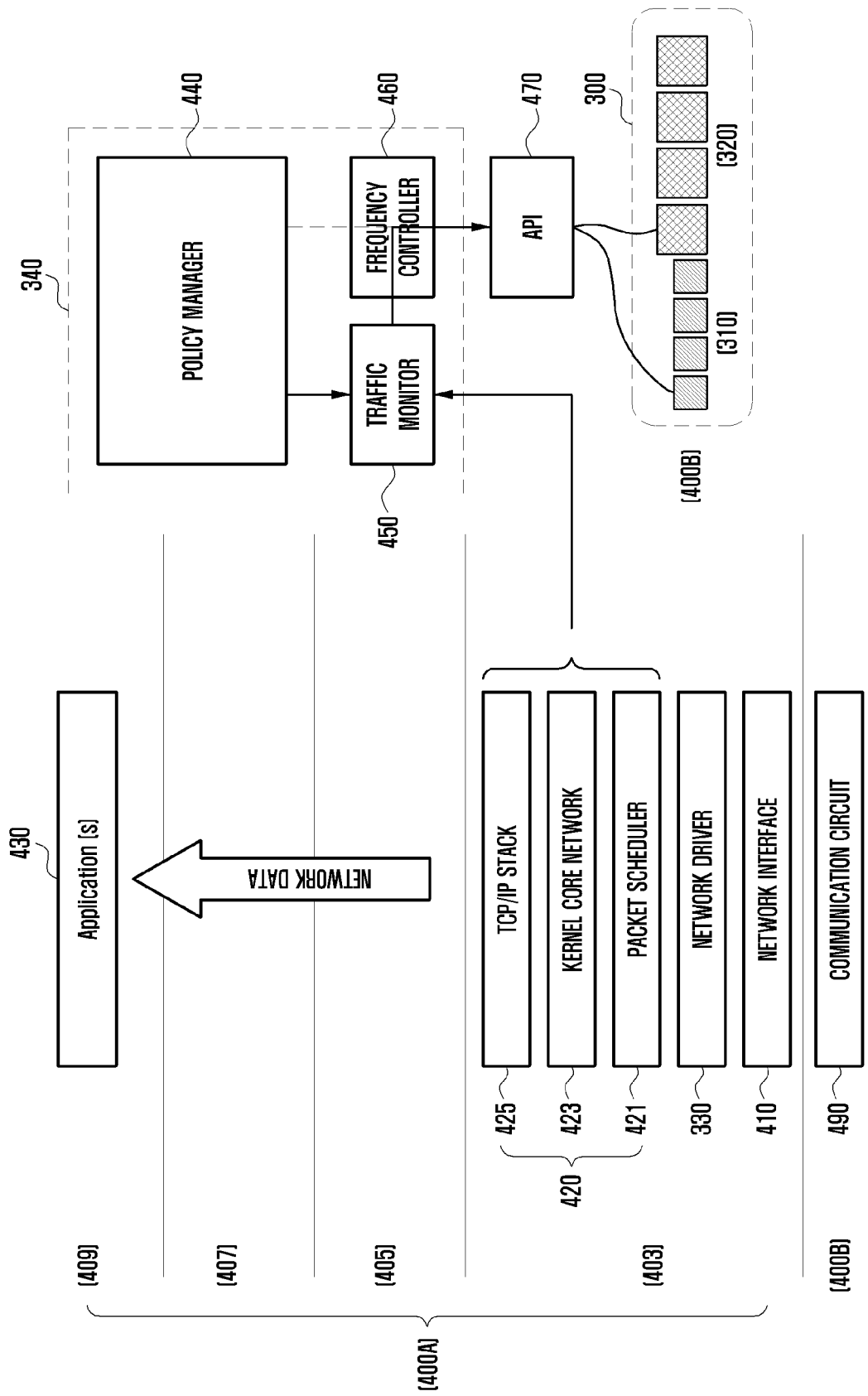
FIG. 4 is a diagram illustrating a software stack of an electronic device according to an embodiment of the disclosure.

FIG. 4 is a diagram illustrating a software stack of an electronic device according to an embodiment of the disclosure.

Referring to FIG. 4, an electronic device 101 including the multi-core processor 300 (e.g., the processor 120 of FIG. 1 or FIG. 2) according to various embodiments may include a software area 400A (or software) and a hardware area 400B (or hardware). In the example shown in FIG. 4, the software area 400A may include a network interface 410, a network stack 420, an application 430, the core management controller 340, and an API 470. For example, the network interface 410, the network stack 420, the application 430, the core management controller 340, and the API 470 may be software (e.g., the program 140 of FIG. 1) loaded on a memory (e.g., the memory 130 of FIG. 1 or the memory 350 of FIG. 3). In the example shown in FIG. 4, the hardware area 400B may include the multi-core processor 300 and a communication circuit 490 (e.g., the wireless communication module 192 of FIG. 1 or 2).

According to an embodiment, the software (or an OS architecture) of the software area 400A may include a kernel area 403, a library area 405, a framework area 407, and a user area 409 (or an application area). According to an embodiment, the electronic device 101 may include the network interface 410, the network driver 330, and the network stack (or a protocol stack) 420 included in the kernel area 403, and the application 430 (e.g., the application 146 of FIG. 1) included in the user area 409.

According to an embodiment, the network interface 410 may generate a packet structure (e.g., a socket buffer) capable of processing data received for each network in the network stack 420 through the network driver 330. For example, the network interface 410 may be a virtual network interface expressed in software. For example, the network interface 410 may indicate a virtual network interface (or a device) configured in software, one or more network interfaces 410 (e.g., rmnet0 {e.g., 4G rmnet}, rmnet1 {e.g., 5G rmnet}, rmnet2 {e.g., Wi-Fi interface}, . . . ) may be configured in one physical communication circuit 490, and a plurality of communication circuits 490 may be connected to one network interface 410 according to implementation. According to an embodiment, the network interface 410 may indicate a network device identified by an assigned IP address. For example, a first network (e.g., LTE) and a second network (e.g., a Wi-Fi) may be network interfaces that are separated from each other in a physical or software manner, and may include a plurality of network interfaces (e.g., rmnet0: for IMS, rmnet1: for Internet) according to application or quality of service (QoS) even for the same network (e.g., LET). A separate IP address may be assigned to each of the plurality of network interfaces. For example, the communication circuit 490 and the network interface 410 may be implemented in N:M mapping (N and M are the same or different natural numbers) mapping. According to an embodiment, the communication circuit 490 and the network interface 410 may have a separate IP address, and when viewed from a higher software area, the communication circuit 490 and the network interface 410 may operate as a separate network device for each network interface 410. According to various embodiments, the policy determination unit may include a unit of the network interface 410 (e.g., the software area 400A) having the separate IP address within the electronic device 101.

According to an embodiment, the network stack 420 may include, for example, a packet scheduler 421, a kernel core network 423, and a TCP/IP stack 425. According to an embodiment, the electronic device 101 may include the multi-core processor 300 including the multiple cores 311, 312, 313, and 314 of the first cluster 310 and the multiple cores 321, 322, 323, and 324 of the second cluster 320, and the core management controller 340. According to an embodiment, the core management controller 340 may be included in the multi-core processor 300 or may be operated independently or together with the multi-core processor 300.

According to an embodiment, the electronic device 101 may transmit a packet received through the network driver 330 to the application 430 of the user area 409 through the network stack 420, and may provide the packet to the user as a specific service through the application 430. According to an embodiment, in the electronic device 101, the packet received from the network through the communication circuit 490 may be processed is in the order of the network interface 410, the network driver 330, the network stack 420, and the application 430. The received packet may be processed by a core designated to process the packet among the multiple cores.

According to various embodiments, when receiving the packet through the network interface 410, the network driver 330 may transmit the received packet to the packet scheduler 421.

According to an embodiment, the electronic device 101 may receive a packet from a network (e.g., the second network 199 of FIG. 1 or 2) outside the electronic device 101 through the communication circuit 490 of the hardware area 400B. According to an embodiment, the packet received through the communication circuit 490 may be transmitted to the network driver 330 corresponding to the corresponding network interface through the network interface 410, and the packet may be transmitted to the application 430 (e.g., the application 146 of FIG. 1) of the user area 409 through the network stack 420.

According to an embodiment, when the packet is received in the network interface 410, the packet scheduler 421 of the network stack 420 may transmit the received packet to the corresponding memory (e.g., the memory 350 of FIG. 3) buffer (e.g., queue), and may activate a core (e.g., a cluster) designated in the corresponding buffer memory. The activated core may control the operation of the network driver 330.

According to an embodiment, the packet scheduler 421 may acquire at least one of session information (session ID) of the packet, the number of the core to process the packet, the number of the core of an application (e.g., an application that processes the packet) related to the session information, and/or processing information of each session from the network driver 330. For example, the packet scheduler 421 is software driven in the kernel area 403, and may distinguish the packets received from the network outside the electronic device 101 by session IDs and may assign the cores so that the packets can be distributed and processed in each core.

According to an embodiment, the packet scheduler 421 may transmit the packet transmitted from the network driver 330 to the application 430 of the user area 409 through the network stack 420 (e.g., the TCP/IP stack 425). According to an embodiment, the network stack 420 (e.g., the TCP/IP stack 425) may perform network layer (e.g., IP) and transmission layer (e.g., TCP and/or UDP) processing on the packet. For example, the TCP/IP stack 425 may perform IP processing and a TCP procedure on the received packet, and may transmit the TCP-processed packet to the corresponding memory (e.g., the memory 350 in FIG. 3) buffer or the corresponding application 430.

According to an embodiment, the packet scheduler 421 may determine a packet (or network) processing core that processes the packet transmitted from the network driver 330 or a cluster of the core. According to various embodiments, the packet scheduler 421 may monitor information (e.g., a new data flow) related to the packet transmitted/received through the network, and may determine the core (or a plurality of cores in a cluster unit) to process the packet and the frequency designated in the corresponding core (or the plurality of cores in a cluster unit). According to an embodiment, the packet scheduler 421 may configure the frequency of the core that processes a packet related to a data flow to a designated frequency. According to an embodiment, the packet scheduler 421 may process an operation corresponding to the core management controller 340 according to various embodiments. According to another embodiment, the packet scheduler 421 may be controlled by the core management controller 340 to operate by receiving at least one piece of information according to the above operation from the core management controller 340.

According to various embodiments, when receiving the packet from the network driver 330, the packet scheduler 421 may obtain boosting-related information from the core management controller 340 and may process boosting related to a core that processes the packet. According to an embodiment, the core management controller 340 may be included in the packet scheduler 421 as software, or may be operated independently or together with the packet scheduler 421. According to an embodiment, the core management controller 340 may monitor a network in which a session with the electronic device 101 is established, and may control a processor boosting (e.g., CPU boosting) operation (e.g., boosting {frequency adjustment} of a core processing a packet) based on the monitoring.

According to various embodiments, the core management controller 340 may represent a control module capable of controlling a processor frequency based on monitoring of a network connection. According to various embodiments, the core management controller 340 may include a policy manager 440, a traffic monitor 450, and a frequency controller 460. According to an embodiment, when implemented as software, the policy manager 440 may be disposed in at least one area of the framework area 407 (e.g., OS area) or the user area 409. According to an embodiment, the traffic monitor 450 and the frequency controller 460 may be disposed in the library area 405 and/or the framework area 407.

According to various embodiments, the policy manager 440 may manage a policy related to processor (or CPU) boosting. For example, the policy manager 440 may manage a configuration for a boosting condition (e.g., a boosting start condition) and/or a boosting method. According to an embodiment, the configuration of the boosting condition and/or the boosting method may be provided to the user based on a designated user interface through the application 430 of the user area 409. According to various embodiments, the configuration of the boosting condition and/or the boosting method may be configured, for example, for each type of network, application, and/or resource identifier (e.g., URI, uniform resource identifier). A configuration operation for the boosting condition and/or the boosting method according to various embodiments will be described later.

According to an embodiment, the policy manager 440 may transmit information related to the boosting condition to the traffic monitor 450. According to an embodiment, when receiving information satisfying the boosting condition from the traffic monitor 450, the policy manager 440 may transmit frequency control triggering to the frequency controller 460. According to an embodiment, the policy manager 440 may transmit the information related to boosting (e.g., frequency information or boosting information) to the frequency controller 460 together with the frequency control triggering. For example, the policy manager 440 may provide designated frequency information corresponding to the network in which the packet is received, at least based on the boosting condition and the boosting method.

According to various embodiments, the traffic monitor 450 may monitor a data flow for each network interface and may identify a new data flow based on the monitoring result. According to an embodiment, the traffic monitor 450 may monitor a boosting start condition for the new data flow based on configuration information of the policy manager 440. In various embodiments, the data flow may represent a flow divided into a 4-tuple (e.g., source IP, source port, destination IP, destination port), and may be managed by a flow table as shown in the example of Table 1 below. In various embodiments, the new data flow is, for example, a data flow newly generated without being included in the flow table. In a state in which a session is established between the electronic device 101 and the network (or a server), the data flow may include a data flow that is newly started. According to an embodiment, when the new data flow is generated, the electronic device 101 may register related information (e.g., a flow hash value) in the flow table.

TABLE 1

| Flow ID | Flow Start Time | Last Packet Timestamp | Network Interface | Packet Count | Burst Count | RTT | App ID | Boost | Skip |
|---|---|---|---|---|---|---|---|---|---|
| FID1 | 0 s | 0.5 s | Wi-Fi | 30 | 2 | 50 ms | App3 | | |
| FID2 | 0.5 s | 0.5 s | 5G | 1 | 1 | | | | |

In consideration of an example of the flow table according to an embodiment based on Table 1, Flow IDs (e.g., FID1, FID2) may indicate, for example, IDs generated by a combination (e.g., using a hash function) of a source IP, a source port, a destination IP, and a destination port (destination IP). As shown in Table 1, the flow table may record information related to at least one of a data flow generation start time (e.g. a flow start time), a last packet reception time (e.g. last packet timestamp), a network interface from which a packet is received, the number of packets (e.g. a packet count) and/or the number of bursts (e.g. a burst count) which are received so far, and a time difference (e.g. RTT, round-trip-time) value (e.g., average or maximum) between two consecutively received packets or between two data bursts. According to an embodiment, when an application receiving a packet or an application identifier (e.g., App ID) can be known, a corresponding application identifier may be recorded in the flow table. According to an embodiment, in the flow table, in a "Boost" item, "True" may be recorded when a processor boosting (e.g., CPU boosting) condition is satisfied from the corresponding data flow, and "False" may be recorded when the processor boosting condition is not satisfied. According to an embodiment, in the flow table, in a "Skip" item, "True" may be recorded when a boosting maintenance condition is not satisfied after the processor boosting from the corresponding data flow.

The traffic monitor 450 may monitor transmission/reception packets passing through the network stack 420 for each network interface. According to an embodiment, when the data flow ID of the received packet is not in the flow table, the traffic monitor 450 may determine a new data flow, may add the new data flow to the flow table, and may start monitoring based on a boosting condition for the new data flow. According to various embodiments, the traffic monitor 450 may manage generation or deletion related to the data flow based on the flow table. According to an embodiment, as shown in the example of Table 1, the traffic monitor 450 may monitor a last packet reception time for each generated data flow ID, and may delete a corresponding data flow ID from the flow table when there is no data reception during a predetermined time (e.g., a rest timer) from the last packet reception time based on the result of the monitoring.

According to an embodiment, examples of updating the flow table (e.g., generating or deleting related to data flow) are disclosed in Tables 2, 3, 4, and 5 below.

According to an embodiment, the following Table 2 shows an example of receiving a new data flow (e.g., FID2) when about 0.5 seconds have elapsed from the boosting start time (e.g., about 0 s).

TABLE 2

| Flow ID | Flow Start Time | Last Packet Timestamp | Network Interface | Packet count | Burst count | RTT | App ID | Boost | Skip |
|---|---|---|---|---|---|---|---|---|---|
| FID1 | 0 s | 0.49 s | Wi-Fi | 30 | 2 | 50 ms | App3 | | |
| FID2 | 0.5 s | 0.5 s | LTE | 1 | 1 | — | | | |

According to an embodiment, Table 3 below may show an example of a flow table updated when about 1 second has elapsed from the boosting start time. For example, in the existing data flow (e.g., FID1), there is a packet received at about 1 second, but the packet count does not meet the boosting condition for the Wi-Fi network, so False (F) may be recorded in the "Boost" item, and monitoring for boosting may be terminated for the existing data flow (e.g., FID1). According to an embodiment, the existing data flow (e.g., FID1) may be maintained in the flow table until there is no packet for a reset timer time.

TABLE 3

| Flow ID | Flow Start Time | Last Packet Timestamp | Network Interface | Packet count | Burst count | RTT | App ID | Boost | Skip |
|---|---|---|---|---|---|---|---|---|---|
| FID1 | 0 s | 1 s | | | | | | F | |
| FID2 | 0.5 s | 0.5 s | LTE | 5 | 5 | 15 ms | App5 | | |

According to an embodiment, Table 4 below may show an example of a flow table updated when about 1.5 seconds have elapsed from the boosting start time. For example, an example of a case in which a new data flow (e.g., FID3) is received and added to the flow table may be represented when about 1.5 seconds have elapsed. According to an embodiment, a new data flow (e.g., FID3) satisfies a boosting condition for a 5G network connection, and boosting may be started for the new data flow. According to an embodiment, the existing data flow (e.g., FID2) represents a case where there is no packet during a reset timer (e.g., about 1 s) after the last packet reception time (e.g., about 0.5 s), and the existing data flow (e.g., FID3) may be deleted from the flow table.

TABLE 4

| Flow ID | Flow Start Time | Last Packet Timestamp | Network Interface | Packet count | Burst count | RTT | App ID | Boost | Skip |
|---|---|---|---|---|---|---|---|---|---|
| FID1 | 0 s | 1.5 s | — | — | — | — | — | F | |
| FID3 | 1.5 s | 1.5 s | 5G | 1 | 1 | — | App1 | T | |

According to an embodiment, Table 5 below shows a case in which the existing data flow (e.g., FID1) has no packet longer than the reset timer (e.g., about 1 s) since the last packet reception time (e.g., about 1 s) when about 2.5 seconds have elapsed from the boosting start time, and the existing data flow (e.g., FID1) may be deleted from the flow table. According to an embodiment, the existing data flow (e.g., FID3) does not satisfy the boosting maintenance condition, and True (T) may be recorded in boosting initialization and "Skip" items. According to an embodiment, the existing data flow (e.g., FID3) may be maintained in the flow table in a "Skip:T" state, and the packet of the corresponding data flow may be excluded from boosting thereafter.

TABLE 5

| Flow ID | Flow Start Time | Last Packet Timestamp | Network Interface | Packet count | Burst count | RTT | App ID | Boost | Skip |
|---|---|---|---|---|---|---|---|---|---|
| FID3 | 1.5 s | 2.5 s | 5G | 100 | 10 | — | App1 | F | T |

According to various embodiments, the traffic monitor 450 may receive a policy for a processor frequency control condition (e.g., boosting condition) from the policy manager 440, may monitor the boosting condition based on the received policy, and may transmit triggering for processor frequency control or boosting condition satisfaction information to the policy manager 440 when the boosting condition is satisfied.

According to various embodiments, the frequency controller 460 may control (e.g., boost) the frequency in units of cores and/or clusters of the multi-core processor 300. According to an embodiment, the frequency controller 460 may receive a boosting command from the traffic monitor 450 or the policy manager 440, and may control a processor (e.g., CPU) frequency through the application programming interface (API) 470 for frequency control based on the boosting command. According to an embodiment, the frequency controller 460 may change a processor minimum frequency (e.g., CPU minimum frequency) value of a core (or a packet processing core) that processes the network driver receiving the packet or the same cluster (e.g., the first cluster 310 {e.g., little cluster} or the second cluster 320 {e.g., big cluster}) as the corresponding core to a designated boost frequency value. For example, the frequency controller 460 may change a default frequency (e.g., about 455 MHz) for initial packet processing to a maximum available frequency or a frequency (about 1690 MHz or about 1794 MHz) close to the maximum frequency. According to an embodiment, the frequency controller 460 may receive a boosting end command after a designated time (e.g., about 1 second) or from the traffic monitor 450 or the policy manager 440, and may change a processor minimum frequency (e.g., CPU minimum frequency) value to a default value based on a boosting end command.

According to various embodiments, when receiving more than a designated number (e.g., N, N is a natural number) in a new data flow, the electronic device 101 may boost a core that processes a corresponding packet or a frequency of a cluster to which the corresponding core belongs to increase the initial throughput of the electronic device 101. According to an embodiment, the electronic device 101 may detect reception (or connection) of the new data flow based on a specific network interface of the electronic device 101 by the traffic monitor 450, and may determine whether a boosting start condition (e.g., RTT condition satisfaction, application identification, or whether to be connected to an external server {e.g., an MEC server}) for the new data flow based on the policy of the policy manager 440. According to an embodiment, the electronic device 101 may perform frequency boosting of a core (or a cluster including the core) that processes the packet by the frequency controller 460 when the boosting start for the new data flow is determined. For example, the electronic device 101 may configure a minimum frequency among available frequencies to a pre-determined value or more. According to an embodiment, the electronic device 101 may control the core that receives and processes the packet from the network interface and/or CPU boosting of the cluster to which the core belongs. For example, when a processing core of a data flow related to CPU boosting belongs to a low-power CPU cluster, the electronic device 101 may boost the low-power CPU cluster. As another example, when a processing core of a data flow related to CPU boosting belongs to a high-power CPU cluster, the electronic device 101 may boost the high-power CPU cluster.

The boosting time according to various embodiments may be determined at least based on, for example, a reception time of a designated packet (e.g., K {K is a natural number}-th) of the new data flow, a session establishment time, a reception time of a first data burst, and a reception time of a second data burst (e.g., an N-th data burst) after the reception of the first data burst. According to an embodiment, the electronic device 101 may provide boosting control according to the boosting start time in a state in which a session is connected/maintained for one data flow. It will be described with reference to the drawings to be described later in relation to the boosting control according to the boosting time in various embodiments.

The electronic device 101 according to various embodiments of the disclosure may include a communication circuit (e.g., the network interface 410 of FIG. 4 or the communication circuit 490 of FIG. 4) for communication with a designated network (e.g., a 5G network, an LTE network, a Wi-Fi network, or a WLAN), a processor (e.g., the processor 120 of FIG. 1 or the multi-core processor 300 of FIG. 3 or 4) configured to include the multiple cores, and a memory (e.g., the memory 130 of FIG. 1 or the memory 350 of FIG. 3) configured to be operatively connected to the processor, wherein the memory may store instructions that, when executed, cause the processor to detect a new data flow based on the communication circuit, to identify a type of a network connected through the communication circuit, to identify a boosting start condition for the new data flow based on a policy related to the identified network, and to configure a frequency of a core that processes a packet related to the new data flow to a designated frequency when boosting for the new data flow is started.

According to various embodiments of the disclosure, the instructions may cause the processor to configure a minimum frequency among available frequencies of the processor to be a designated value or greater.

According to various embodiments of the disclosure, the instructions may cause the processor to monitor at least one of round-trip-time (RTT), an application, whether an MEC connection is established, or a network state to identify the boosting start condition.

According to various embodiments of the disclosure, the instructions may cause the processor to determine the boosting start time at least based on the characteristics of the communication circuit or the packet processing core.

According to various embodiments of the disclosure, the communication circuit may include a plurality of communication circuits for a plurality of different types of networks, and the instructions may cause the processor to monitor a data flow for each communication circuit.

According to various embodiments of the disclosure, the instructions may cause the processor to perform boosting at a first time point when the new data flow is detected through a first cluster (e.g., the first cluster 310 of FIG. 3 or FIG. 4) or a first communication circuit related to a core belonging to the first cluster, and to perform boosting at a second time point different from the first time point when the new data flow is detected through a second cluster or a second communication circuit related to a core belonging to the second cluster (e.g., the second cluster 320 of FIG. 3 or FIG. 4).

According to various embodiments of the disclosure, the first cluster or the core included in the first cluster may include a first type core, and the second cluster or the core included in the second cluster may include a second type core having higher performance than that of the first type core.

According to various embodiments of the disclosure, the instructions may cause the processor to determine a boosting time at least based on a designated packet reception time of the new data flow, a session establishment time, a first data burst reception time, or a designated N-th data burst reception time after the reception of the first data burst.

According to various embodiments of the disclosure, the instructions may cause the processor to configure a current frequency of the corresponding core to a designated frequency in a core unit or a cluster unit.

According to various embodiments of the disclosure, the instructions may cause the processor to manage the new data flow by using a flow table, and the new data flow may be a data flow that is newly started in a state in which a session is established between the electronic device and the network while the new data flow is not included in the flow table.

According to various embodiments of the disclosure, the instructions may cause the processor to receive the new data flow and to add the new data flow to the flow table when the new data flow satisfies a boosting condition according to the policy.

According to various embodiments of the disclosure, the instructions may cause the processor to terminate boosting at a predetermined time point after the frequency of the core that processes the packet is configured to be the designated frequency.

According to various embodiments of the disclosure, the instructions may cause the processor to configure a current frequency (F_cur) value or a minimum available frequency (F_min) value to an initial value after a predetermined time from the start of boosting.

According to various embodiments of the disclosure, the instructions may cause the processor to maintain a core usage amount by adjusting a minimum setting value of the configured frequency when the boosting is terminated.

According to various embodiments of the disclosure, the instructions may cause the processor to terminate the boosting at least based on a case in which there is no packet for a predetermined time after the boosting, a case in which the number of packets is less than or equal to a configured threshold for a predetermined time, a case in which a reception throughput or an increase in the number of packets is less than the threshold for a predetermined time after the boosting, or a case in which the reception throughput or a decrease in the number of packets exceeds the threshold for a predetermined time after the boosting.

Hereinafter, a method of operating the electronic device 101 according to various embodiments will be described in detail. According to various embodiments, operations performed by the electronic device 101 to be described below may be executed by at least one processor (e.g., the processor 120 of FIG. 1 as at least one processor including a processing circuit) (hereinafter referred to as the "processor 120") of the electronic device 101. According to an embodiment, the operations performed by the electronic device 101 may be stored in a memory (e.g., the memory 130 of FIG. 1) (hereinafter referred to as the "memory 130"), and may be executed, when executed, by instructions that cause the processor 120 to operate.

Figure 5:
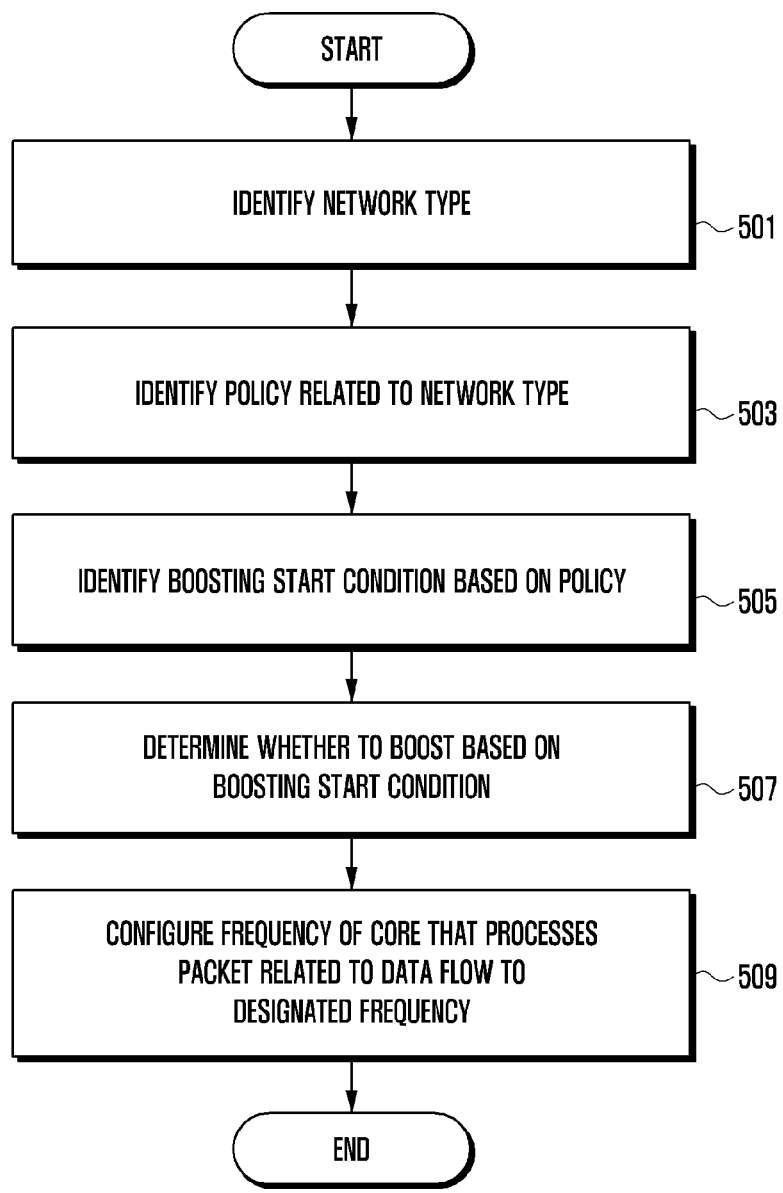
FIG. 5 is a flowchart illustrating a method of operating an electronic device according to an embodiment of the disclosure.

FIG. 5 is a flowchart illustrating a method of operating an electronic device according to an embodiment of the disclosure.

Referring to FIG. 5, in operation 501, a processor 120 (e.g., the multi-core processor 300 of FIG. 3) of an electronic device 101 may identify a network type. When connected to a network, the processor 120 may identify the type of the connected network (e.g., a 5G network, an LTE network, or a Wi-Fi network). According to an embodiment, the processor 120 may identify the type of the network at least based on a communication circuit (or network interface) that receives a packet and/or a network driver.

In operation 503, the processor 120 may identify a policy related to the network. According to an embodiment, the processor 120 may determine a policy configured in association with the network. For example, the processor 120 may identify a policy related to the identified network from among the configured policies.

In operation 505, the processor 120 may identify a boosting start condition based on the policy related to the network. According to an embodiment, the processor 120 may identify the boosting start condition based on a new data flow, and an operation of identifying the boosting start condition according to an embodiment will be described later.

In operation 507 the processor 120 may determine boosting based on the boosting start condition. According to an embodiment, the processor 120 may determine whether to perform boosting based on whether the new data flow is included in the boosting start condition, and an operation of determining whether to perform boosting according to an embodiment will be described later.

In operation 509, the processor 120 may configure a frequency of a core (or a cluster including the corresponding core) processing a packet to a designated frequency (e.g., a boost frequency) based on the determination of the boosting. For example, the processor 120 may change (or boost) a first designated frequency related to the core processing the packet to a second designated frequency, and may process initial data transmission with the network, thereby improving data throughput. For example, the processor 120 may increase the amount of processing packets of the corresponding session during an initial predetermined period.

Figure 6:
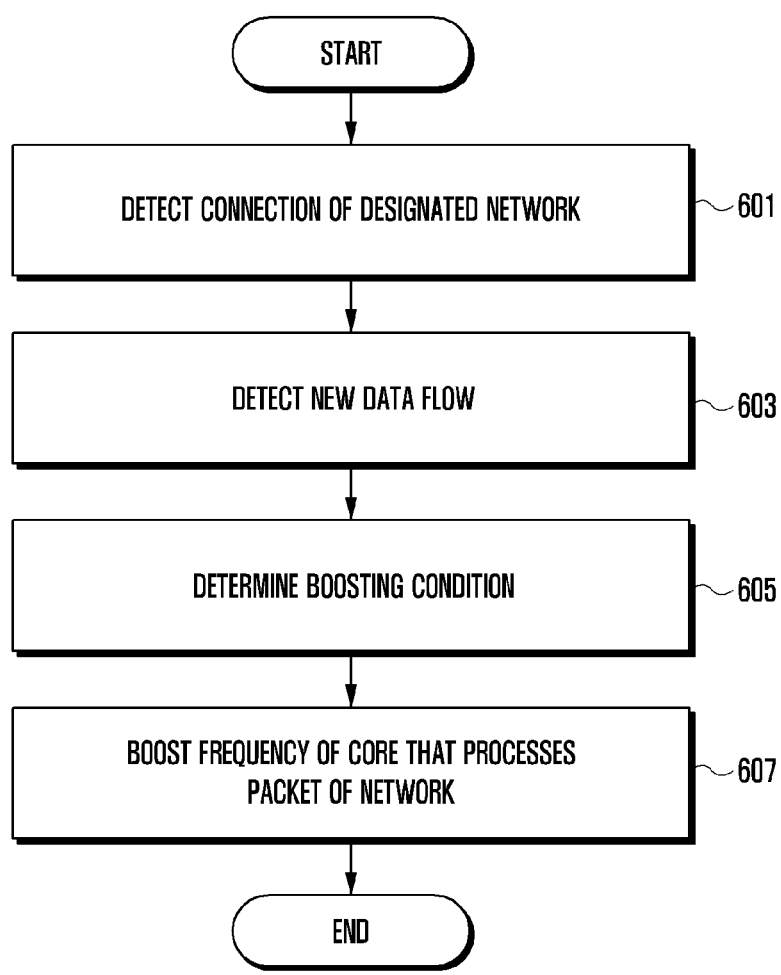
FIG. 6 is a flowchart illustrating a method of operating an electronic device according to an embodiment of the disclosure.

FIG. 6 is a flowchart illustrating a method of operating an electronic device according to an embodiment of the disclosure.

Referring to FIG. 6, in operation 601, a processor 120 (e.g., the multi-core processor 300 of FIG. 3) of an electronic device 101 may detect a connection of a designated network (e.g., a specific network {e.g., a 5G network, an LTE network, or a Wi-Fi network} or a specific server {e.g., an MEC server}). According to an embodiment, the processor 120 may detect the connection of the designated network such as a 5G network or the connection of the designated server (e.g., an MEC server) from packet transmission/reception network interface information of the electronic device 101, an IP address, or domain name system (DNS) packet information through the traffic monitor 450.

In operation 603, the processor 120 may detect a new data flow. According to an embodiment, the processor 120 may monitor a data flow for each network interface (or a communication circuit) through the traffic monitor 450. According to an embodiment, the processor 120 may identify the new data flow based on a monitoring result.

In operation 605, the processor 120 may determine whether the new data flow satisfies a boosting condition by using a policy configured through the policy manager 440 based on the detecting of the new data flow. For example, the processor 120 may determine whether packets (e.g., N) greater than or equal to a designated number of packets according to the policy are received from the new data flow received through the network interface. For example, the processor 120 may determine whether an N-th packet (or a K-th packet burst) is received from the network interface. According to an embodiment, the number of packets "N" and the number of packet bursts "K" may be determined according to the policy configured in the policy manager 440. According to an embodiment, the processor 120 may determine the boosting condition by monitoring a network channel state, an RTT, or a packet transmission application independently or together (or additionally) according to the policy through the traffic monitor 450.

In operation 607, when the new data flow satisfies the boosting condition, the processor 120 may boost the frequency (e.g., CPU clock frequency) of the core (or a cluster to which the corresponding core belongs) processing the packet of the corresponding network. According to an embodiment, the processor 120 may perform boosting by fixing a minimum frequency among available frequencies to a predetermined value or greater through an API for frequency control (e.g., the API 470 of FIG. 4). According to an embodiment, in a case in which the network channel state, the RTT, or the packet transmission application are monitored according to the policy through the traffic monitor 450, when the network channel state, the RTT, or the packet transmission application satisfy the boosting condition and the number of received packets exceeds a predetermined value, the processor 120 may control the boosting.

According to various embodiments, the processor 120 may change the frequency of a core (or a cluster to which the corresponding core belongs) that receives and processes (or triggers CPU boosting) a packet from the network interface to a boost frequency. According to an embodiment, when the core (e.g., a core triggering CPU boosting) that receives and processes the packet from the network interface (e.g., a 5G or LTE network interface) belongs to a first type core (e.g., a low-performance core, a low-power core, or a little core), the processor 120 may boost a cluster (e.g., the first cluster 310 of FIG. 3 or FIG. 4) to which the first type core belongs. According to an embodiment, when the core (e.g., a core triggering CPU boosting) that receives and processes the packet from the network interface (e.g., a Wi-Fi network interface) belongs to a second type core (e.g., a high-performance core, a high-power core, or a big core), the processor 120 may boost a cluster (e.g., the second cluster 320 of FIG. 3 or FIG. 4) to which the second type core belongs.

According to various embodiments, when receiving a designated number of packets (e.g., N, N is a natural number) from the new data flow, the processor 120 may boost the frequency of the core processing the corresponding packet and the cluster to which the corresponding core belongs, thereby increasing initial throughput of the electronic device 101. According to an embodiment, the processor 120 may detect the reception (or connection) of the new data flow based on a specific network interface of the electronic device 101 by the traffic monitor 450, and may determine whether a boosting start condition (e.g., RTT condition satisfaction, application identification, or whether to be connected to an MEC) for the new data flow according to the policy of the policy manager 440. According to an embodiment, when determining to start boosting for the new data flow, the processor 120 may control frequency boosting (e.g., configures a minimum frequency among available frequencies to a predetermined value or greater) of the core (e.g., the cluster including the corresponding core) processing the packet by the frequency controller 460.

Figure 7:
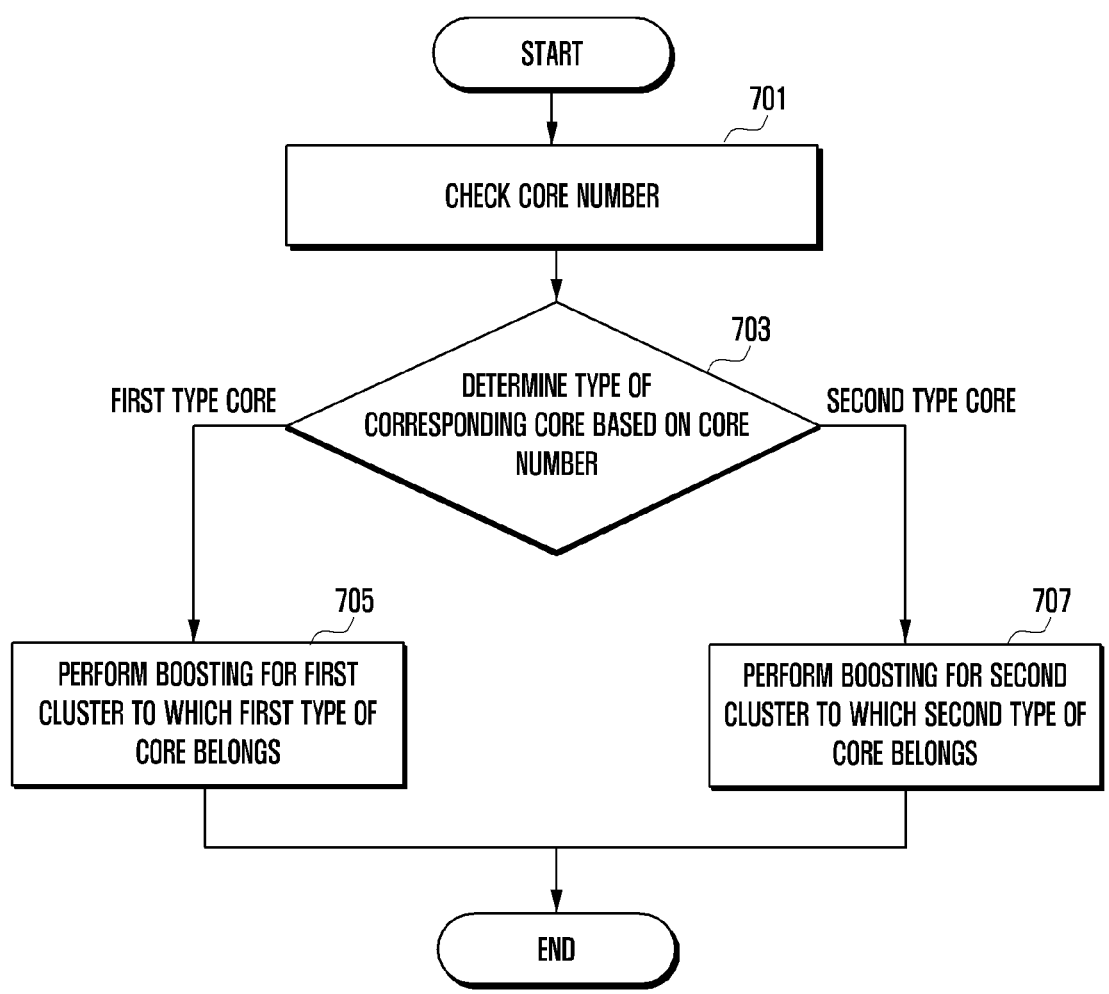
FIG. 7 is a flowchart illustrating a method of operating an electronic device according to an embodiment of the disclosure.

FIG. 7 is a flowchart illustrating a method of operating an electronic device according to an embodiment of the disclosure.

Referring to FIG. 7, in operation 701, a processor 120 (e.g., the multi-core processor 300 of FIG. 3) of an electronic device 101 may check a core number of a core processing a network packet. According to an embodiment, the processor 120 of the electronic device 101 may identify a core (e.g., a core triggering CPU boosting) that receives or processes a packet from a network interface (e.g., a 5G or LTE network interface). According to an embodiment, in the core processing the network packet, as described in the description with reference to FIGS. 3 and 4, a core that processes the network driver 330 and a core that processes a network protocol (e.g., TCP/IP) stack may be different from each other. For example, the processor 120 may check the core number of the core that processes the network driver 330 for a new data flow.

In operation 703, the processor 120 may determine a type of the corresponding core based on the core number. For example, the processor 120 may identify whether the core processing the network driver (and/or the core processing the network packet) belongs to a first type core (e.g., a low-performance core, a low-power core, or a little core) or a second type core (e.g., a high-performance core, a high-power core, or a big core) based on the core number. According to an embodiment, n cores 311, 312, 313, 314, 321, 322, 323, and 324 included in the first cluster 310 and the second cluster 320 may be referred to as core numbers (e.g., core 0, core 1, core 2, core 3, core 4, . . . , and core n). Then cores 311, 312, 313, 314, 321, 322, 323, and 324 may be classified into the first cluster 310 and the second cluster 320 according to the performance. According to an embodiment, the processor 120 may identify (or determine) whether each core is included in the first cluster 310 or the second cluster 320 based on the core number.

In operation 703, when it is determined that the core that receives and processes the packet is the first type core as a result of determining the type of the core, in operation 705, the processor 120 may boost the first cluster (e.g., the first cluster 310 of FIG. 3 or FIG. 4) to which the first type core belongs.

When it is determined that the core that receives and processes the packet is the second type core as the result of determining the type of the core in operation 703, in operation 707, the processor 120 may boost the second cluster (e.g., the second cluster 320 of FIG. 3 or FIG. 4) to which the second type core belongs.

According to various embodiments, as illustrated in FIG. 7, when a boosting condition for the new data flow is satisfied, the processor 120 may check the core number of a core that processes the corresponding data flow to boost the corresponding cluster. For example, in the case of LTE, the core processing the network driver may be determined as the first type core, and in the case of Wi-Fi, the core processing the network driver may be determined as the second type core.

According to various embodiments, the processor 120 may operate a boosting start time in various ways. Hereinafter, an operation of determining the boosting start time according to various embodiments will be described.

Figure 8:
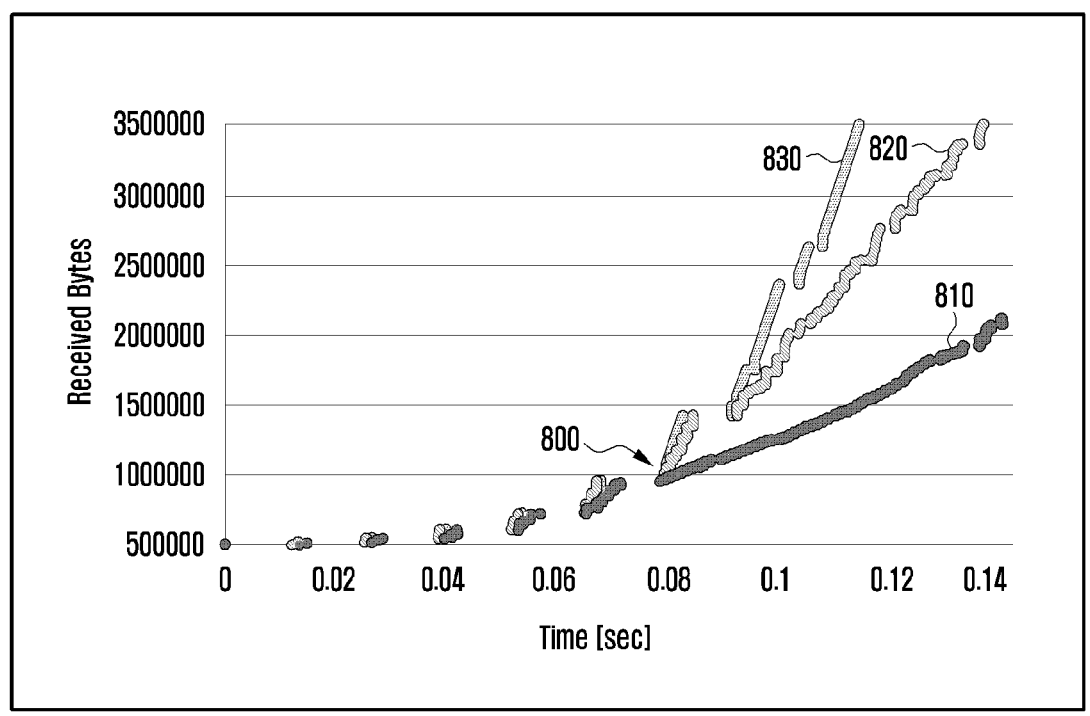
FIG. 8 is a diagram illustrating an example of determining a boosting start time in an electronic device according to an embodiment of the disclosure.

FIG. 8 is a diagram illustrating an example of determining a boosting start time in the electronic device 101 according to an embodiment of the disclosure.

According to an embodiment, in the embodiment illustrated in FIG. 8 may indicate, for example, a reception data increase pattern at the beginning of a TCP connection. According to an embodiment, when considering slow start characteristic of TCP, for example, a reception time of about an N-th data burst may be determined as a boosting time. In an embodiment, the data burst may represent a set of a plurality of consecutive packets having a packet reception time interval within a specific time (e.g., about 1 ms).

Referring to FIG. 8, an X-axis may represent time (e.g., seconds (sec)), and a Y-axis may indicate the amount of received data (e.g., received bytes). In the embodiment illustrated in FIG. 8, the pattern of reference numeral 810 indicates a reception data increase pattern in default without initial CPU boosting (ICB, initial CPU boosting), reference numeral 820 indicates a reception data increase pattern in a combination of default and initial CPU boosting, and reference numeral 830 indicates a reception data increase pattern in a combination of packet scheduling and initial CPU boosting. As illustrated in FIG. 8, when the initial CPU boosting is included like the pattern of reference numeral 820 and the pattern of reference numeral 830, it is confirmed that throughput increases faster than before (e.g., the pattern of reference numeral 810) after receiving a predetermined packet. For example, in consideration of the slow start characteristic of TCP, the time at which a performance gap starts to increase (e.g., in the embodiment illustrated in FIG. 8, the time at which an about N-th (e.g., 7th) data burst 800 is received) may be determined as the actual frequency boosting time.

According to an embodiment, frequency boosting may have a characteristic in which, for example, the boosting accuracy is improved as the number of monitoring items and packets increases, but a boosting delay corresponding to the increase in the number of items and packets increases. In an embodiment, boosting with a large number of monitoring items and/or packets and with a predetermined boosting delay is referred to as a conservative boosting (CB) mode, and rapid boosting with a small number of monitoring items and/or packets is referred to as an aggressive boosting (AB) mode. According to an embodiment, the electronic device 101 may select the conservative boosting (CB) mode when using a network having a relatively higher current consumption or in a state in which the electronic device 101 is sensitive to current consumption, such as a power saving mode.

FIGS. 9, 10, 11, and 12 are diagrams illustrating examples of an initial boosting start time in an electronic device according to various embodiments of the disclosure.

In the embodiments illustrated in FIGS. 9, 10, 11, and 12, in common, the electronic device 101 may communicate with at least one network 901, and may perform a selection procedure for selecting a domain name system (DNS) server 903 and the network 901 during link setup with the network 901. According to an embodiment, the electronic device 101 may transmit a DNS query to the DNS server 903, and may receive a DNS response from the DNS server 903 in response to the transmission. For example, the electronic device 101 may perform data communication with the DNS server 903 through a DNS query/response data path. According to an embodiment, the network 901 may include a first network (e.g., a 5G network), a second network (e.g., an LTE network), or a third network (e.g., a Wi-Fi network or a WLAN), but is not limited thereto. In an embodiment, FIGS. 9, 10, 11, and 12 are diagrams illustrating various embodiments related to an initial boosting start time, a description of the communication operation of the electronic device 101, the network 901, and/or the DNS server 903 will be omitted.

Figure 9:
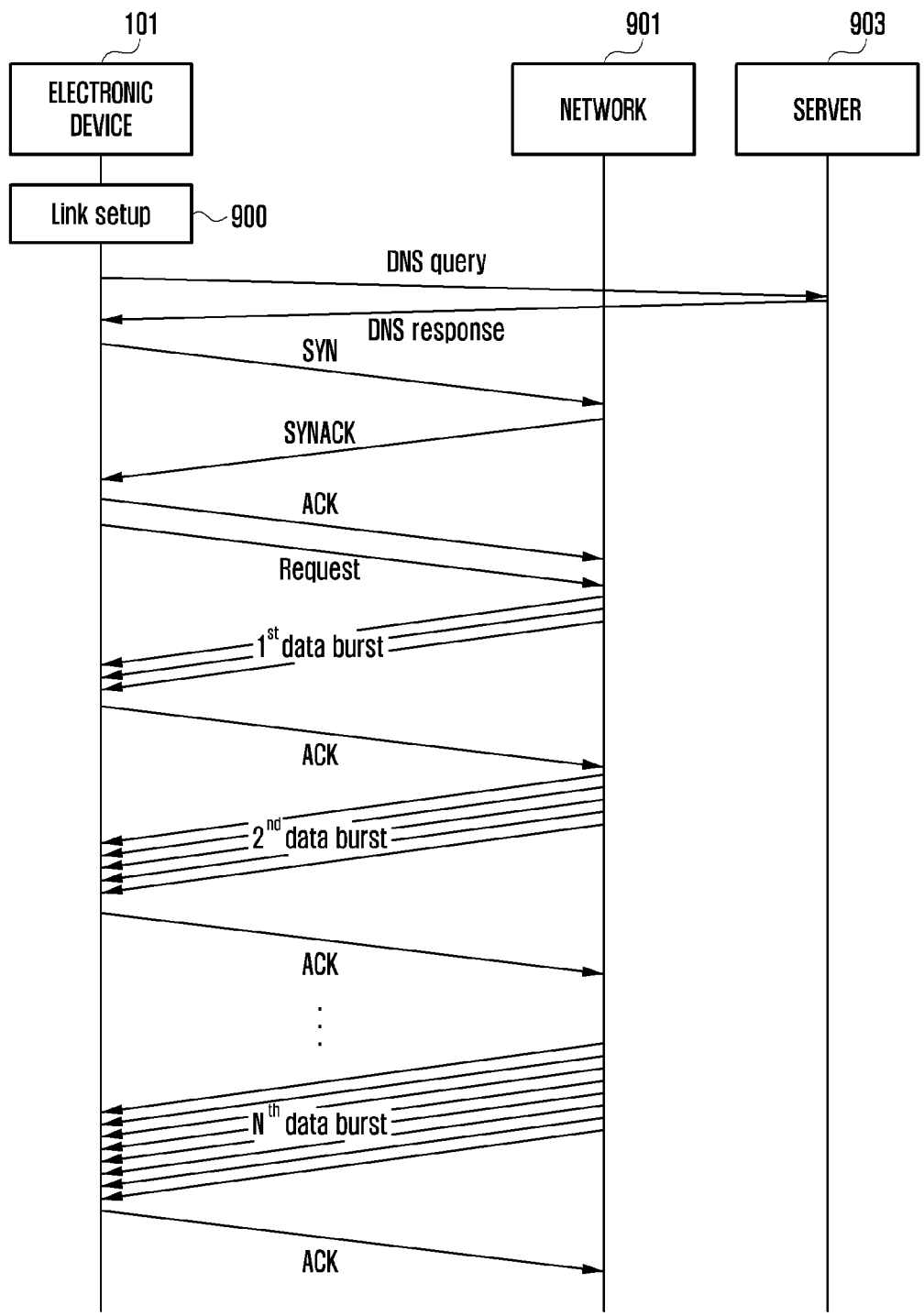
FIGS. 9, 10, 11, and 12 are diagrams illustrating examples of an initial boosting start time in an electronic device according to various embodiments of the disclosure.
Figure 10:
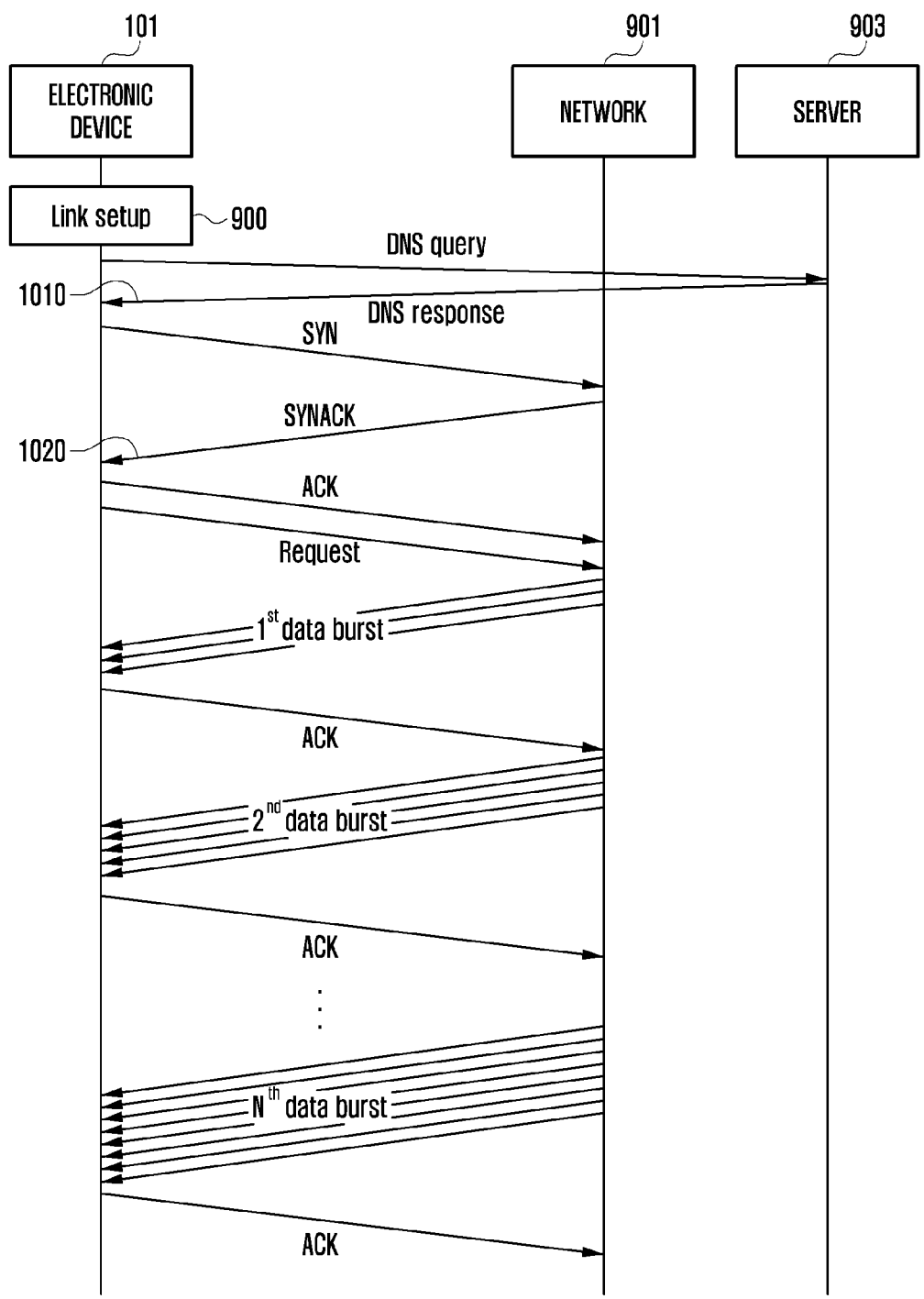
Figure 11:
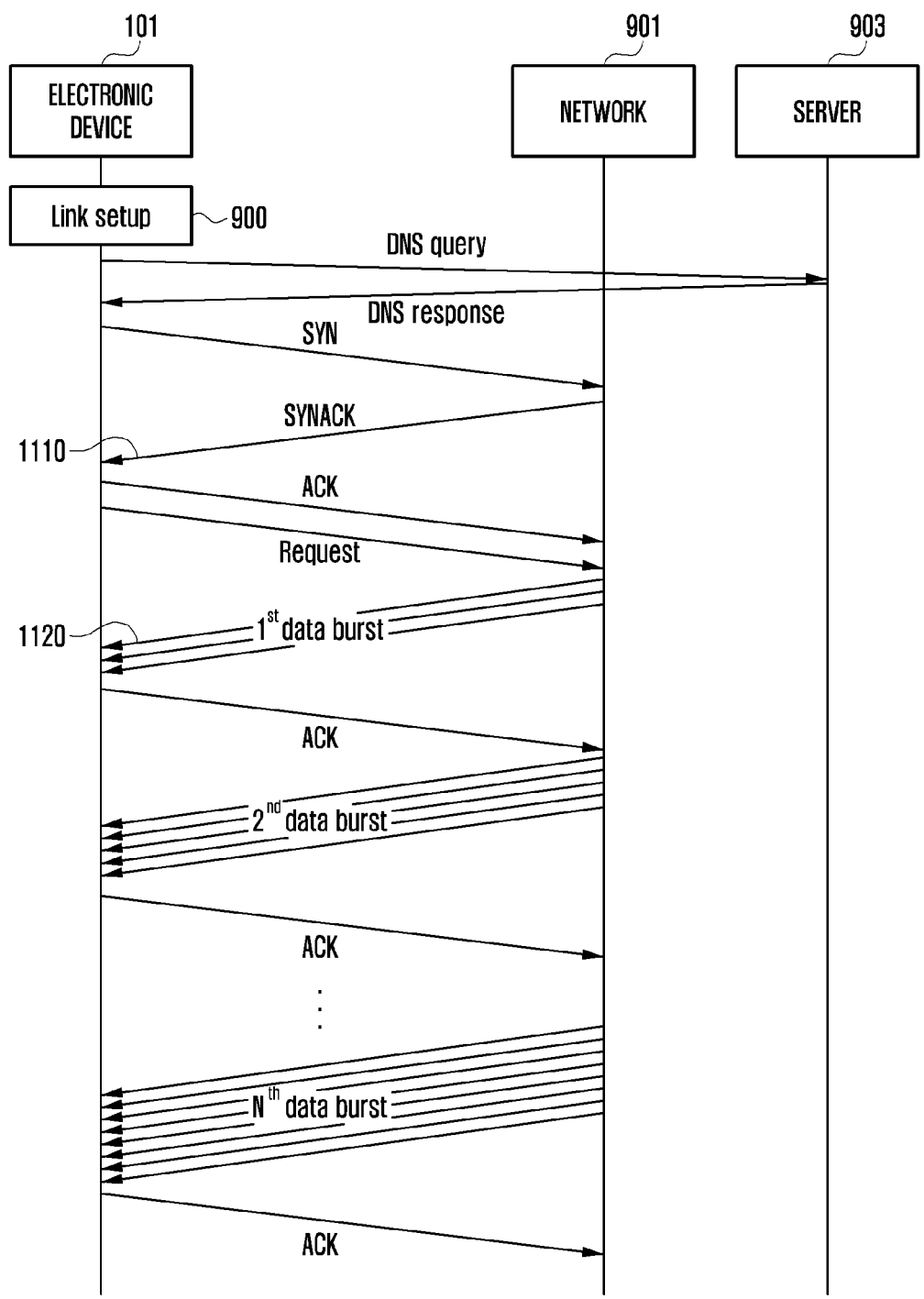
Figure 12:
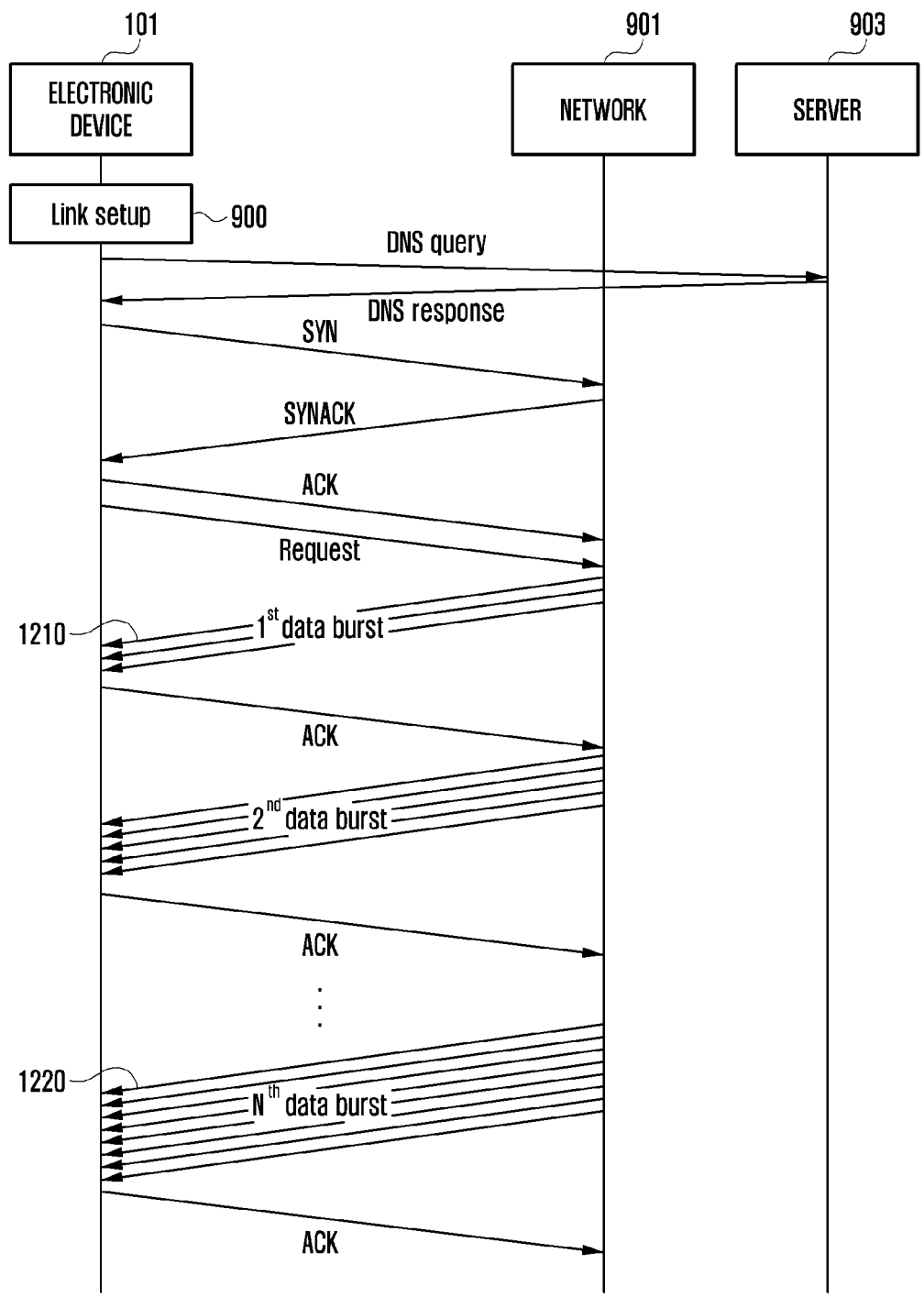

According to an embodiment, FIGS. 9, 10, 11, and 12 may illustrate various embodiments of the initial boosting (e.g., initial CPU boosting (ICB)) start time of the electronic device 101. According to an embodiment, the embodiment illustrated in FIG. 9 is a case in which boosting is performed immediately when an initial packet (e.g., a first packet) is generated in a link setup (e.g., a 5G link setup) state, for example, an example closest to the aggressive boosting (AB) mode may be shown. The embodiment illustrated in FIG. 12 is a case in which boosting is performed after a predetermined number of packets is monitored, and for example, an example closest to the conservative boosting (CB) mode may be shown. According to an embodiment, the embodiments illustrated in FIGS. 10 and 11 may represent another example in which boosting is possible between the aggressive boosting mode according to FIG. 9 and the conservative boosting mode according to FIG. 10.

Referring to FIG. 9, the electronic device 101 may start boosting based on a 5G (e.g., MEC or URLLC) link setup operation (or time point) 900. According to an embodiment, the electronic device 101 may determine a network connection characteristic during the 5G link setup 900. According to an embodiment, the network connection characteristic may include at least one of, for example, 5G link information, cell information (e.g., Cell ID), channel quality, an available bandwidth (e.g., available BW), PDU session information, service quality flow information (e.g., QFI, QoS flow ID), network slice information (e.g., network slice ID), or terminal IP information (e.g., DHCP). According to an embodiment, when receiving the initial packet (e.g., the first packet) or a K-th packet through the corresponding link (e.g., 5G link) based on the network connection characteristic, the electronic device 101 may start boosting of a corresponding core (e.g., a cluster to which the corresponding core belongs) (e.g., CPU cluster). According to another embodiment, when a specific packet mark is detected from the corresponding electronic device 101 (e.g., a link device {e.g., modem}) based on the network connection characteristic or when a specific signaling packet is received, the electronic device 101 may start boosting of the corresponding core (or the cluster to which the core belongs).

Referring to FIG. 10, according to an embodiment, in a DNS query/response operation 1010, the electronic device 101 may perform data communication with the DNS server 903 through a DMS query/response data path with the DNS server 903 to determine a domain name (e.g., uniform resource locator (URL)) and/or a service type of a connection server (e.g., the network 901). According to an embodiment, the electronic device 101 may transmit the DNS query to the DNS server 903, and may receive the DNS response from the DNS server 903 in response to the DNS query. According to an embodiment, the electronic device 101 may start boosting based on a synchronization operation 1020 (e.g., a Synchronize Acknowledge (SYNACK) reception operation) of obtaining information related to the network 901 connected to the DNS server 903 based on data communication. For example, as illustrated in FIG. 10, the electronic device 101 may start boosting for a corresponding CPU cluster when a specific session is established (e.g., TCP 3-way handshake). According to an embodiment, the information related to the network 901 may include, for example, a server-side port number, a server-side port number, a server-side IP address (e.g., an address band), TCP connection information (e.g., window size), a round trip time (RTT), a processing CPU ID of the network driver for a received packet (e.g., big or LITTLE cluster), and/or application information (e.g., App ID).

Referring to FIG. 11, according to an embodiment, the electronic device 101 may determine a TCP normal establishment with the network 901. In a case in which RTT verification and/or payload inspection are possible based on a first service request/response (e.g., HTTP) operation 1110 (e.g., when a requested service type and/or a requested data size is inspected), when a first data burst is received in 1120, the electronic device 101 may start boosting for the corresponding CPU cluster at the time at which a second reception packet is generated based on a received packet of a specific data flow.

Referring to FIG. 12, according to an embodiment, the electronic device 101 may start boosting the CPU cluster at the time of receiving the N-th data burst in operation 1220 or at the time of receiving the K-th packet after the first data burst is received from the network 901 in operation 1210. According to an embodiment, the electronic device 101 may start boosting for the corresponding CPU cluster in at least one of a case in which there is the N-th data burst (e.g., see FIG. 8), a case in which the number of packets of the N-th data burst is equal to or greater than a designated first threshold when the K-th packet arrives within a predetermined time (e.g., RTT*N), a case in which the number of the previously received packets of the corresponding data flow is equal to or greater than a designated second threshold when the N-th data burst arrives, or a case in which the size of the previously received data is equal to or greater than a designated third threshold when the N-th data burst or the K-th packet is received.

In the various embodiments illustrated in FIGS. 9, 10, 11, and 12, the closer to the first embodiment (e.g., see FIG. 9), the more the electronic device 101 aggressively boost the CPU cluster. The closer to the fourth embodiment (e.g., see FIG. 12), the more the electronic device 101 conservatively boost the CPU cluster.

According to an embodiment, in the boosting method as in the first embodiment (e.g., FIG. 9), when an actual data reception amount is large, it may be simpler to find the boosting time point, and boosting may be possible quickly. For example, it may be effective to apply the same method as in the first embodiment at the time of a 5G or MEC connection.

According to an embodiment, in the boosting method as in the fourth embodiment, boosting may be performed most conservatively, and the boosting time point may be the slowest, but the probability of a false boosting (e.g., boosting is wasteful in terms of energy due to a small actual data reception amount) may be minimized. For example, it may be effective to apply the same method as in the second embodiment at the time of a Wi-Fi connection using a high-performance CPU.

According to various embodiments, the electronic device 101 may select (or determine) an optimal mode (or the boosting method) among the first embodiment (e.g., the boosting method of FIG. 9), the second embodiment (e.g., the boosting method of FIG. 10), the third embodiment (e.g., the boosting method of FIG. 11), or the fourth embodiment (e.g., the boosting method of FIG. 12) according to a network interface (e.g., the network interface 410 of FIG. 4) (or the network) that receives data. For example, the electronic device 101 may select an initial CPU boosting (ICB) mode (e.g., aggressive boosting {AB} mode {e.g., the method of FIG. 9 or 10}) or a conservative boosting (CB) mode (e.g., the method of FIG. 11 or 12) to operate, based on the type (e.g., the type of the network) of the network interface.

According to an embodiment, boosting based on the AB mode may be performed at the time of a 5G network connection. For example, when the first packet is received after the 5G network link setup is completed, when the IP address of the DNS response or the first received packet matches the IP range of the MEC server, or when an available bandwidth (available BW) is greater than or equal to a designated first threshold and RTT is less than or equal to a designated second threshold, boosting may be performed.

According to an embodiment, boosting based on the AB mode may be performed when the basic usage core of the network driver is a little core (or little cluster). For example, in the little core (or cluster), when an amount of current consumption increase according to an increase in the CPU frequency in the little core (or cluster) is small, the current network driver is an LTE driver, and the LTE driver's basic usage core (or an LTE driver processing core) is a little core (or cluster), boosting may be performed based on the AB mode.

According to an embodiment, boosting based on the AB mode may be performed when a packet corresponding to a corresponding application socket is received in a case in which an execution application belongs to a boosting list.

According to an embodiment, boosting based on the CB mode may be performed at the time of a non-5G network connection (e.g., Wi-Fi, LTE). For example, boosting may be performed when the available bandwidth (available BW) is less than or equal to the designated first threshold or RTT is greater than or equal to the designated second threshold.

According to an embodiment, boosting based on the CB mode may be performed when the basic usage core of the network driver is a big core (or a big cluster). For example, when the current network driver is a Wi-Fi driver and the basic usage core (or Wi-Fi driver processing core) of the Wi-Fi driver is a big core (or cluster), boosting may be performed based on the CB mode.

According to an embodiment, when the remaining battery capacity of the electronic device 101 is less than or equal to a designated value (e.g., about X %), when the electronic device 101 is in a power saving mode, or when the electronic device 101 is in a screen-off state, boosting based on the CB mode may be performed. According to an embodiment, when the battery capacity of the electronic device 101 is less than or equal to the designated value, when the electronic device is in the power saving mode, when the electronic device is in a screen-off state, or when an application is executed in the background, boosting may be omitted (e.g., no boosting).

According to an embodiment, the CPU frequency in the electronic device 101 may be configured in a range of a minimum available frequency (e.g., F_min) and a maximum available frequency (e.g., F_max), and the current frequency (e.g., F_cur) may be variably used within a designed range, as in Equation 1 below.

$$F\_min < F\_cur < F\_max \quad \text{Equation 1}$$

According to various embodiments, when a CPU frequency boosting condition is satisfied, the electronic device 101 may configure the minimum available frequency (F_min) value to be a value (e.g., F_min≤F_max) greater than the existing value and smaller than or equal to the maximum available frequency (F_max). Through this, the CPU frequency boosting effect can be obtained by increasing the minimum value of the current frequency (F_cur).

According to an embodiment, an example of selecting the current frequency (F_cur) or the minimum available frequency (F_min) value when boosting the CPU in the electronic device 101 according to an embodiment will be described below.

For example, as to given information, an average of 1 packet processing time (T_fi) may be given for each frequency (fi) of each CPU cluster (i=1, 2, . . . , and n, n is the number of available frequency indexes), throughput requirement (R) may be selected from a value provided by a service application or server (e.g., MEC server), a specific value given for each network interface, or the available bandwidth (available BW) estimated from the used network, and an average packet size L may be given. Under this assumption, to select the current frequency (F_cur) or the minimum frequency (F_min) value, the minimum "fi (frequency per CPU cluster)" in which Equation 2 below is satisfied may be selected (e.g., configure fi to F_min value).

$$L/T\_fi > R + \alpha \quad \text{Equation 2}$$

In Equation 2, 'α' denotes a margin, and since the processing speed increases as the frequency "fi" increases, the processing time T_fi may decrease.

According to various embodiments, boosting may be terminated at a predetermined time point after initial CPU boosting. According to an embodiment, the electronic device 101 may lower only a minimum setting value of the CPU frequency when the boosting ends, and when the CPU usage continues to be high, the electronic device 101 may continue to be used in a state where the CPU frequency is high. The initial CPU boosting end time according to an embodiment may be obtained as follows.

According to an embodiment, the electronic device 101 may return the current frequency (F_cur) value or the minimum available frequency (F_min) value to the initial value after a predetermined time (e.g., reset timer) (e.g., about 2 seconds) has elapsed from the start of the initial CPU frequency boosting. For example, in a case in which CPU frequency boosting is started with the minimum available frequency (F_min) value, when the CPU usage is high even if the minimum available frequency (F_min) value is returned to the initial value, the existing high value may be used as the current frequency (F_cur) value. Accordingly, the electronic device 101 may continuously use the high CPU frequency when the throughput is high even after the boosting is terminated.

According to an embodiment, the electronic device 101 may terminate boosting when there are no packet for a predetermined time after boosting, or when the number of packets is less than or equal to a configured threshold for a predetermined time.

According to an embodiment, when the amount of increase in reception throughput or the number of packets is less than a threshold for a predetermined time (e.g., C*RTT) after boosting, or when the amount of decrease in the reception throughput or the number of packets exceeds the threshold for the predetermined time (e.g., C*RTT) after boosting, the electronic device 101 may terminate boosting.

According to various embodiments, the electronic device 101 may operate by configuring boosting start and end times differently for each network interface and/or for each packet processing cluster (or used CPU cluster). For example, in the case of a little core (or a little cluster), a difference in current consumption between the high frequency and low frequency of the CPU is not relatively large compared to the big core (or big cluster), and therefore the boosting start time can be configured earlier and the end time can be configured later. For example, since the network interface using a low-power CPU cluster consumes relatively little power due to false boosting, the reset timer may be configured longer compared to a high-power CPU cluster. In an embodiment, the false boosting may indicate a case in which CPU frequency boosting is performed, but the actual CPU usage rate is low and thus there is no boosting effect and power consumption occurs.

Hereinafter, an example of configuring the boosting start and end conditions for each network interface will be described.

According to various embodiments, the boosting start condition for each network interface may be applied by differentiating CPU boosting conditions for each network interface in the policy manager 440. According to an embodiment, in the case of a 5G network interface, CPU boosting may be applied to high-speed, low-latency large-capacity data. According to an embodiment, in the case of an LTE network interface, CPU boosting may be applied when communication with the MEC server is detected or the RTT is very low (e.g., about 10 ms or less). According to an embodiment, in the case of a Wi-Fi network interface (or a network interface using a high performance CPU as a basis), a packet count or burst count threshold may be the largest, and the most conservative embodiment (e.g., the method of FIG. 12) may be applied. According to another embodiment, the electronic device 101 may filter the boosting condition for each application identifier (e.g., App ID). For example, it is possible to monitor a large file download application (e.g., App 1) and a high-definition streaming application (e.g., App 2) and may apply CPU boosting.

According to various embodiments, as to the boosting end condition for each network interface, for example, when the number of packets received during a reset timer (e.g., about 2 s) time after boosting is less than a reset PPS threshold, boosting may be terminated.

According to various embodiments, an example of the boosting condition for each network interface may be shown in Table 6 below.

TABLE 6

| Network Interface | Packet Count | Burst Count | RTT | App ID | Reset Timer | Reset PPS Threshold |
|---|---|---|---|---|---|---|
| 5G | 2 | — | — | App {1, 2, 3} | 2 s | 40000 |
| LTE | 100 | — | 10 ms | App {1} | 2 s | 10000 |
| WiFi | 1000 | 7 | — | App {1, 3} | 1 s | 20000 |
| ... | ... | ... | ... | ... | ... | ... |

Figure 13:
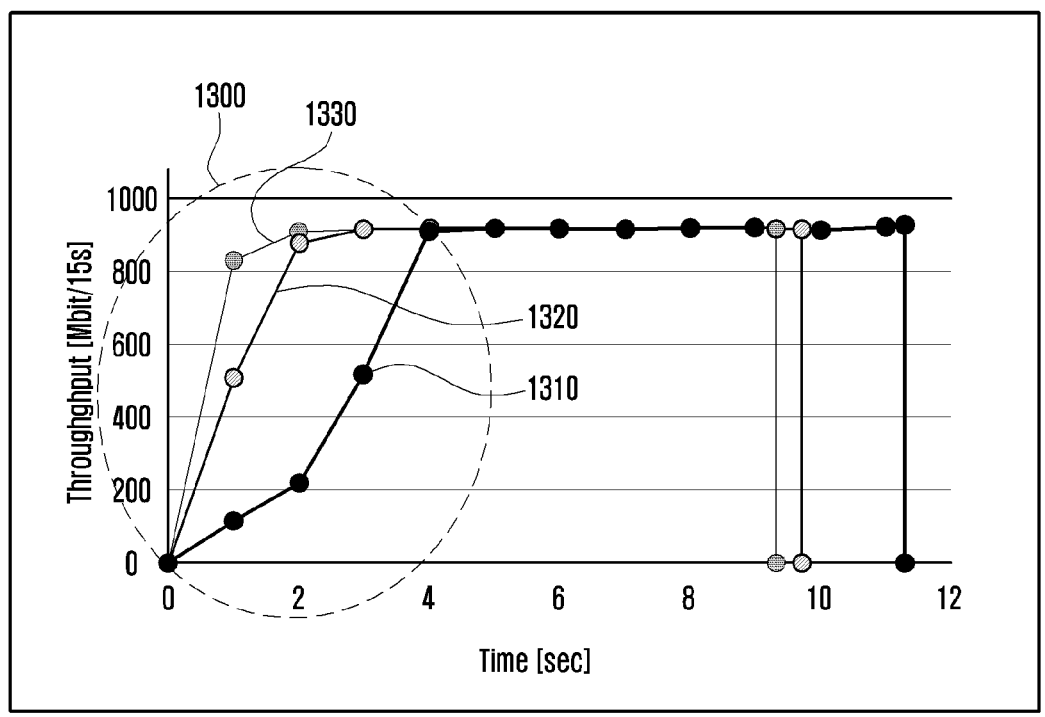
FIGS. 13, 14, and 15 are diagrams illustrating performance comparison according to initial CPU boosting in an electronic device according to various embodiments of the disclosure.
Figure 14:
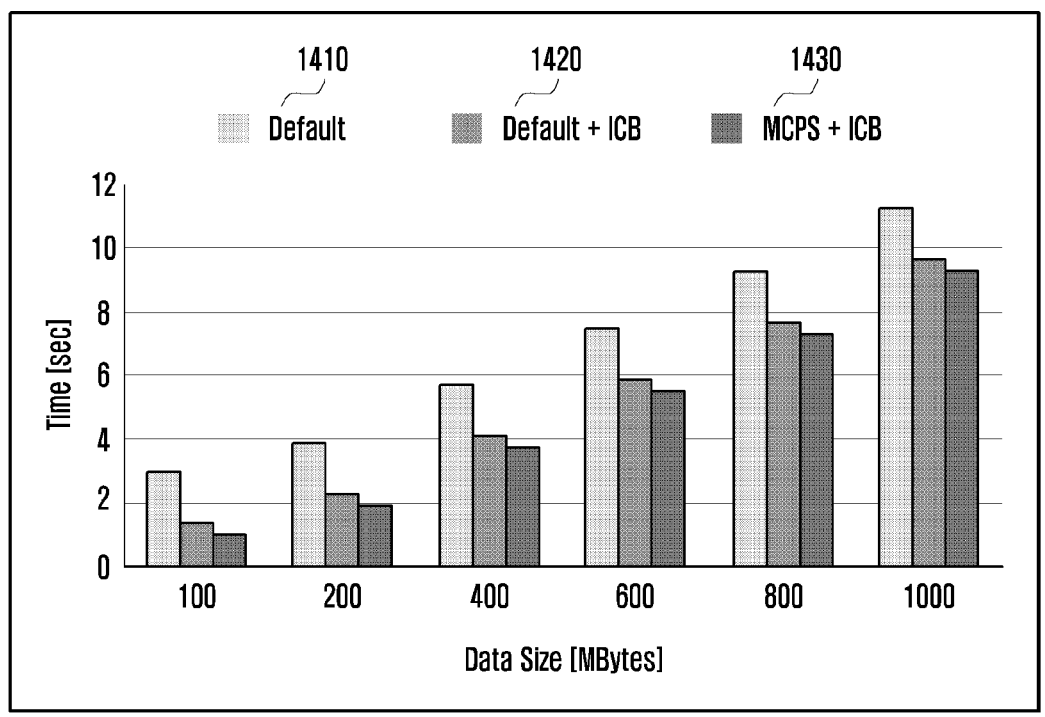
Figure 15:
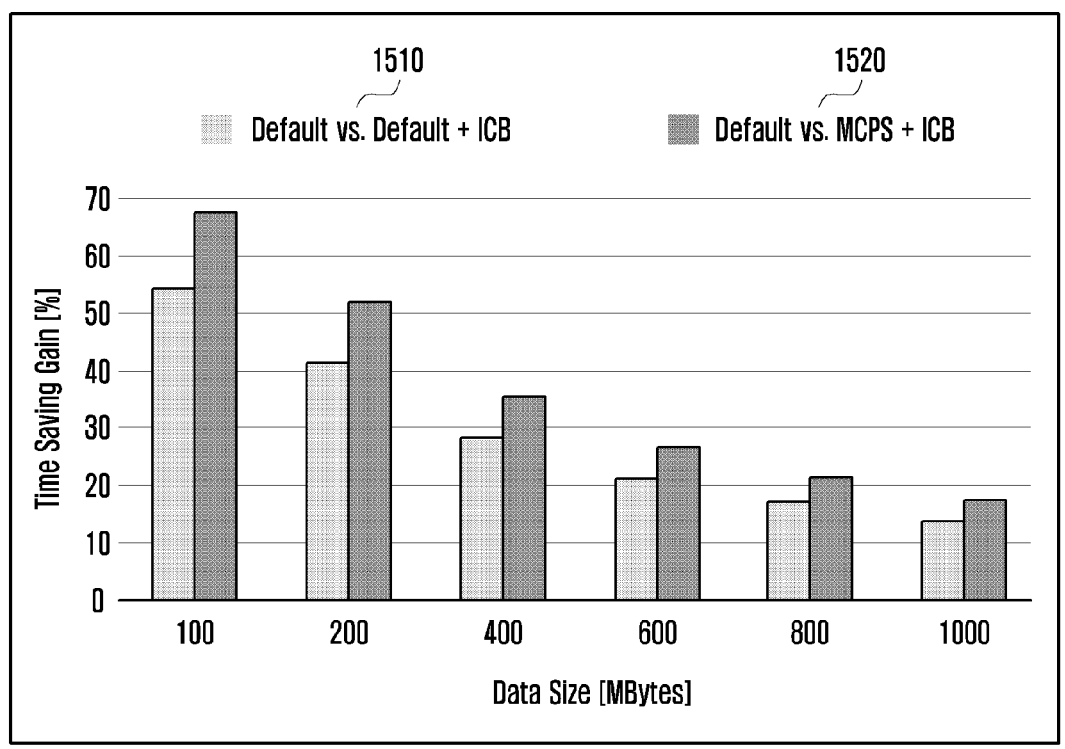

FIGS. 13, 14, and 15 are drawings illustrating performance comparison according to initial CPU boosting in an electronic device according to various embodiments of the disclosure.

Referring to FIG. 13, FIG. 13 illustrates, for example, a progress of throughput when initial CPU boosting according to various embodiments is applied and a progress of throughput when the initial CPU boosting is not applied, when about 1 GB of data is downloaded from an electronic device 101. As in the embodiment illustrated in FIG. 13, when the initial CPU boosting is applied, it can be seen that a problem caused by initial slow start is solved when data of the same size is transmitted.

According to an embodiment, in FIG. 13, an X-axis may indicate time (e.g., seconds (sec)), and a Y-axis may indicate throughput (e.g., Mbit/s). In the embodiment shown in FIG. 13, a pattern of reference numeral 1310 indicates a throughput progress in default without initial CPU boosting, reference numeral 1320 indicates a throughput progress in a combination of default and initial CPU boosting, and reference numeral 1330 indicates a throughput progress in a combination of packet scheduling and the initial CPU boosting. As shown in reference numeral 1300 of FIG. 13, it can be seen that the throughput is greatly improved when the initial CPU boosting is applied between about 0 seconds and 4 seconds and the download completion time of data is also shortened according to the initial CPU boosting. For example, when downloading is performed by default to which the initial CPU boosting is not applied, the download completion time may be about 11.3 seconds. When downloading is performed by combining the default and the initial CPU boosting, the download completion time may be about 9.7 seconds, and when downloading is performed in a combination of packet scheduling and the initial CPU boosting, the download completion time may be reduced to about 9.3 seconds.

Referring to FIGS. 14 and 15, FIG. 14 illustrates, for example, a comparison graph of the transmission completion time for each size of data downloaded from the electronic device 101, and FIG. 15 illustrates, for example, a ratio of gain to transmission time for each size of data in the electronic device 101.

According to an embodiment, in FIG. 14, an X-axis may indicate data size (e.g., megabyte (MB)), and a Y-axis may indicate time (e.g., seconds (sec)). In the embodiment illustrated in FIG. 14, reference numeral 1410 may indicate the transmission completion time for each size of data in default without initial CPU boosting, reference numeral 1420 may indicate the transmission completion time for each size of data in a combination of default and initial CPU boosting, and reference numeral 1430 may indicate the transmission completion time for each data size in a combination of packet scheduling and initial CPU boosting.

According to an embodiment, in FIG. 15, an X-axis may indicate a data size (e.g., MB), and a Y-axis may indicate a time saving gain ratio (e.g., %). In the embodiment illustrated in FIG. 15, reference numeral 1510 may indicate a gain ratio for the transmission time between default versus default and an initial CPU boosting combination, and reference numeral 1520 may indicate a gain ratio for the transmission time between default versus packet scheduling and the initial CPU boosting combination.

As illustrated in the embodiments of FIGS. 14 and 15, when initial CPU boosting according to various embodiments is applied, the initial throughput can be greatly improved, and it can be confirmed that the capacity is lowered along with an increase in the transmission time gain. According to an embodiment, the frequency of data transmission of several tens to hundreds of MBs may be higher than that of large-capacity data transmission of several GBs in an actual environment, and thus the effect may be further increased when the initial CPU boosting is applied.

An operation method performed by the electronic device 101 according to various embodiments of the disclosure may include detecting a new data flow based on a network interface, identifying a type of a network connected through the network interface, identifying a boosting start condition for the new data flow based on a policy related to the identified network, and configuring a frequency of a core that processes a packet related to the new data flow to be a designated frequency when boosting for the new data flow is started.

According to various embodiments of the disclosure, the configuring of the frequency of the core may include configuring a minimum frequency among available frequencies of the processor to be a designated value or greater.

According to various embodiments of the disclosure, the detecting of the new data flow may include monitoring a data flow for each network interface, performing boosting at a first time point when the new data flow is detected through a first network interface related to a first cluster or a core belonging to the first cluster, and performing boosting at a second time point different from the first time point when the new data flow is detected through a second network interface related to a second cluster or a core belonging to the second cluster, and the first cluster or the core belonging to the first cluster may include a first type core, and the second cluster or the core belonging to the second cluster may include a second type core having higher performance than the first type core.

According to various embodiments of the disclosure, the operation method may further include managing the new data flow using a flow table when the new data flow is received and the new data flow satisfies a boosting condition according to the policy, and the new data flow may be a data flow that is newly started in a state in which a session is established between the electronic device and the network without being included in the flow table.

According to various embodiments of the disclosure, the operation method may further include terminating boosting at a predetermined time point after the frequency of the core that processes the packet is configured to be the designated frequency, and maintaining a usage of the core by adjusting a minimum setting value of the configured frequency when the boosting is terminated.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
communication circuitry configured to communicate with a long-range communication network or a short-range communication network;
a processor comprising multiple cores; and
memory, storing one or more computer programs, operatively connected to the processor,
wherein the one or more computer programs include instructions that, when executed by the processor, cause the electronic device to:
identify a network connected through the communication circuitry,
in a case that the identified network is the long-range communication network,
assign packets received from the long-range communication network to a first type core, and
boost a processing rate of the first type core to a first designated processing rate when receiving an Nth data burst through the long-range communication network, and
in a case that the identified network is the short-range communication network,
assign packets received from the short-range communication network to a second type core, and
boost a processing rate of the second type core to a second designated processing rate when receiving a Kth data burst through the short-range communication network,
wherein N and K are different natural numbers, and K is greater than N.

2. The electronic device of claim 1,
wherein the one or more computer programs further include instructions that, when executed by the processor, cause the electronic device to configure a minimum frequency, among available frequencies of the processor, to be a designated value or greater, and
wherein a designated processing rate is a maximum available processing rate or a processing rate close to the maximum available processing rate.

3. The electronic device of claim 1, wherein the one or more computer programs further include instructions that, when executed by the processor, cause the electronic device to monitor at least one of round-trip-time (RTT), an application, whether a multi-access edge computing (MEC) connection is established, or a network state to identify a boosting condition.

4. The electronic device of claim 1, wherein the one or more computer programs further include instructions that, when executed by the processor, cause the electronic device to determine a boosting start time and a boosting method based on the identified network.

5. The electronic device of claim 1,
wherein the communication circuitry comprises a first communication circuitry configured to communicate with the long-range communication network and a second communication circuitry configured to communicate with the short-range communication network, and
wherein the one or more computer programs further include instructions that, when executed by the processor, cause the electronic device to monitor a data flow for the first and second communication circuitry.

6. The electronic device of claim 5,
wherein the first type core comprises a low-power core, and the second type core comprises a high-performance core having higher performance than that of the low-power core,
wherein the one or more computer programs further include instructions that, when executed by the processor, cause the electronic device to:
in response to detecting a new data flow through the first communication circuitry, perform boosting for the low-power core at a first time point, and
in response to detecting the new data flow through the second communication circuitry, perform boosting for the high-performance core at a second time point different from the first time point.

7. The electronic device of claim 6, wherein the one or more computer programs further include instructions that, when executed by the processor, cause the electronic device to determine a boosting time at least based on a designated packet reception time of the new data flow, a session establishment time, a first data burst reception time, or a designated data burst reception time after the reception of a first data burst.

8. The electronic device of claim 1, wherein the one or more computer programs further include instructions that, when executed by the processor, cause the electronic device to configure a current frequency of at least one core to a designated frequency in a core unit.

9. The electronic device of claim 6,
wherein the one or more computer programs further include instructions that, when executed by the processor, cause the electronic device to manage the new data flow by using a flow table, and
wherein the new data flow comprises a data flow that is newly started in a state in which a session is established between the electronic device and the identified network while the new data flow is not included in the flow table.

10. The electronic device of claim 9, wherein the one or more computer programs further include instructions that, when executed by the processor, cause the electronic device to, in response to the new data flow satisfying a boosting condition according to a policy related to the identified network, add the new data flow to the flow table.

11. The electronic device of claim 1, wherein the one or more computer programs further include instructions that, when executed by the processor, cause the electronic device to:
terminate boosting at a predetermined time point after a frequency of the first type core or the second type core that processes the packet is configured to be a designated frequency, and
maintain a usage of the first type core or the second type core by adjusting a minimum setting value of the configured frequency when the boosting is terminated.

12. The electronic device of claim 11, wherein the one or more computer programs further include instructions that, when executed by the processor, cause the electronic device to configure a current frequency ($F\_cur$) value or a minimum available frequency (F_min) value to an initial value after a predetermined time from the boosting.

13. The electronic device of claim 11, wherein the one or more computer programs further include instructions that, when executed by the processor, cause the electronic device to terminate the boosting based on at least one of:
 a case in which there is no packet for a predetermined time after the boosting,
 a case in which a number of packets is less than or equal to a configured threshold for a predetermined time,
 a case in which a reception throughput or an increase in the number of packets is less than the configured threshold for the predetermined time after the boosting, or
 a case in which the reception throughput or a decrease in the number of packets exceeds the configured threshold for the predetermined time after the boosting.

14. A method performed by an electronic device comprising communication circuitry, the method comprising:
 identifying a network connected through the communication circuitry;
 in a case that the identified network is a long-range communication network:
  assigning packets received from the long-range communication network to a first type core; and
  boosting a processing rate of the first type core to a first designated processing rate when receiving an Nth data burst through the long-range communication network; and
 in a case that the identified network is a short-range communication network:
  assigning packets received from the short-range communication network to a second type core; and
  boosting a processing rate of the second type core to a second designated processing rate when receiving a Kth data burst through the short-range communication network,
 wherein N and K are different natural numbers, and K is greater than N.

15. One or more non-transitory computer-readable storage media storing one or more computer programs including computer-executable instructions that, when executed by one or more processors of an electronic device individually or collectively, cause the electronic device to perform operations, the operations comprising:
 identifying a network connected through communication circuitry;
 in a case that the identified network is a long-range communication network;
  assigning packets received from the long-range communication network to a first type core; and
  boosting a processing rate of the first type core to a first designated processing rate when receiving an Nth data burst through the long-range communication network;
 in a case that the identified network is a short-range communication network;
  assigning packets received from the short-range communication network to a second type core; and
  boosting a processing rate of the second type core to a second designated processing rate when receiving a Kth data burst through the short-range communication network,
wherein N and K are different natural numbers, and K is greater than N.

* * * * *